United States Patent

Raviv

[15] 3,675,211

[45] July 4, 1972

[54] DATA COMPACTION USING MODIFIED VARIABLE-LENGTH CODING

[72] Inventor: Josef Raviv, Yorktown Heights, N.Y.

[73] Assignee: International Business Machines Corporation, Armonk, N.Y.

[22] Filed: Sept. 8, 1970

[21] Appl. No.: 70,251

[52] U.S. Cl. .......... 340/172.5

[51] Int. Cl. .......... G06f 5/00

[58] Field of Search .......... 340/172.5, 347 DD; 235/154

[56] References Cited

UNITED STATES PATENTS

| | | | |
|---|---|---|---|
| 3,185,823 | 5/1965 | Ellersick, Jr. et al. | 235/154 |
| 3,185,824 | 5/1965 | Blasbalg et al. | 235/154 |
| 3,237,140 | 2/1966 | Blasbalg et al. | 340/172.5 |
| 3,257,646 | 6/1966 | Roth | 340/172.5 |
| 3,339,183 | 8/1967 | Bock | 340/172.5 |
| 3,390,380 | 6/1968 | Cooke-Yarborough et al. | 340/172.5 |
| 3,394,352 | 7/1968 | Wernikoff et al. | 340/172.5 |
| 3,432,811 | 3/1969 | Rinaldi et al. | 340/172.5 |
| 3,448,436 | 6/1969 | Machol, Jr. | 340/172.5 |

*Primary Examiner*—Paul J. Henon
*Assistant Examiner*—Melvin B. Chapnick
*Attorney*—Hanifin and Jancin and Charles P. Boberg

[57] ABSTRACT

A three-state associative memory is employed as an encoding-decoding instrumentality for making conversions between fixed-length codes and variable-length codes. The available variable-length codes are stored in a field of the associative memory that has uniform word lengths. Memory cells which are not needed for storing bits of the variable-length codes are set to a "don't care" state. Fixed-length codes and code length indications corresponding to these stored variable-length codes are stored in other fields of the associative memory. A "COPY" feature enables the system to function with an associative memory of relatively small size which performs normal encoding and decoding operations for the more frequently occurring codes, thereby achieving a high degree of data compaction, while the less frequently occurring codes are handled in a manner that does not achieve such compaction but requires much less memory. Encoding in the "COPY" mode of operation involves appending the fixed-length code word to a special COPY code which is the same for all code words in this category. Decoding a combination code word of this kind involves discarding the COPY code portion and directly utilizing the remainder as the decoded fixed-length code word. Only one line of stored data is needed in the associative memory to handle all code words which use the COPY code.

9 Claims, 13 Drawing Figures

"COPY" FEATURE

INVENTOR
JOSEF RAVIV
BY Charles P. Boberg
ATTORNEY

ENCODE

DECODE

"COPY" FEATURE

ENCODE-WITH "COPY CODE"

DECODE-WITH "COPY CODE"

DATA COMPACTION USING MODIFIED VARIABLE-LENGTH CODING

CROSS-REFERENCE TO RELATED APPLICATION

The copending patent application of Josef Raviv and Michael A. Wesley, Ser. No. 62,306, filed Aug. 10, 1970, discloses and claims the novel features of the present subject matter other than the "COPY" feature shown in FIGS. 6–10 which is claimed herein.

BACKGROUND OF THE INVENTION

Variable-length coding may be employed for data compaction purposes by assigning the shorter-length codes to the more frequently occurring words or bytes, thereby achieving an average code length which is less than that of the fixed-length code bit strings. The choice of variable-length codes to represent the various fixed-length codes is made in accordance with a statistical analysis of the particular data base which is being used. Assuming, for example, that the data are to be processed in bytes, i.e., eight bits at a time, the byte configuration which occurs most frequently may be represented by only one bit in the variable-length coding scheme, the next most frequent combination by a pair of bits, and so forth. Preferably the variable-length codes are prefix-free, that is to say, none of these codes can form the beginning of a longer code bit string. The well-known Huffman codes, for example, meet this requirement.

Although variable-length coding is useful for economizing the facilities and time required for the transmission and storage of data that has been converted into such a code system, the data cannot be processed through a computer in this form and must be converted back to a fixed-length format for processing. The advantage of using variable-length coding to achieve data compaction therefore may be outweighed by the time lost in effecting code conversions by conventional methods. If the code conversion rate can be increased, however, it will greatly enhance the utility of variable-length coding and make its savings available to designers of data processing and data communication systems. There has been a great need for code conversion schemes that will make the use of variable-length coding more practical.

SUMMARY OF THE INVENTION

An important object of the invention is to effect conversions between fixed-length codes and variable-length codes in an economical and expeditious manner which will enhance the usefulness of variable-length coding for data compaction purposes.

In accordance with the present teachings, a three-state associative memory of novel design is employed for both encoding and decoding purposes. This memory includes a field for storing variable-length (VL) codes, a field for storing the corresponding fixed-length codes (often referred to as "identity" codes, or ID's) and a "length" field in which is stored a representation of the number of significant bits in each of the variable-length codes. Those memory cells in the variable-length code field which do not store significant code bits are set to a "don't care" state, in which they are effectively masked from interrogation during the association or search operations that are performed within this memory.

The inclusion of the aforesaid "length" field in the associative memory enables it to function optionally as a means for encoding a fixed-length parallel-bit input to a variable-length serial-bit output, or for decoding a variable-length serial-bit input to a fixed-length parallel-bit output. In the encoding mode, the value which is read from the "length" field denotes the number of valid bits that are to be read serially out of the data register after association has been performed, thereby limiting this readout to the desired variable-length code and excluding the "don't cares" stored in the remaining bit positions (if any) of the data register. In the decoding mode, the "length" value denotes the number of bit positions through which the contents of the argument register are to be shifted after association has been performed in order to bring the bits of the next succeeding variable-length code into proper registry for association.

The use of a full associative memory having one row or "word" of memory cells for each possible fixed-length code bit configuration will enable maximum data compaction to be attained. However, this may require a rather large associative memory. For instance, if the ID code length is one byte (eight bits), then the associative memory must contain as many words as there are eight-bit code combinations, or 256 words in order to achieve maximum compaction. It has been found that with most data bases, however, one can sacrifice a small amount of compaction and thereby effect a large saving in the cost of the associative memory. With a given data base, for example, one may determine that very little data compaction would be lost by using an associative memory encoder-decoder which handles, say, the 150 most frequently occurring ID code bit combinations (corresponding to the 150 shortest variable-length codes), leaving the remaining 156 ID code bit combinations to be handled without code conversion. It is a further object of the present invention to recognize the category into which a particular ID code falls and to handle it with or without variable-length coding in accordance with that determination. This is referred to hereinafter as the "COPY" feature.

DETAILED DESCRIPTION OF SYSTEM WITHOUT COPY FEATURE

Figure 1:
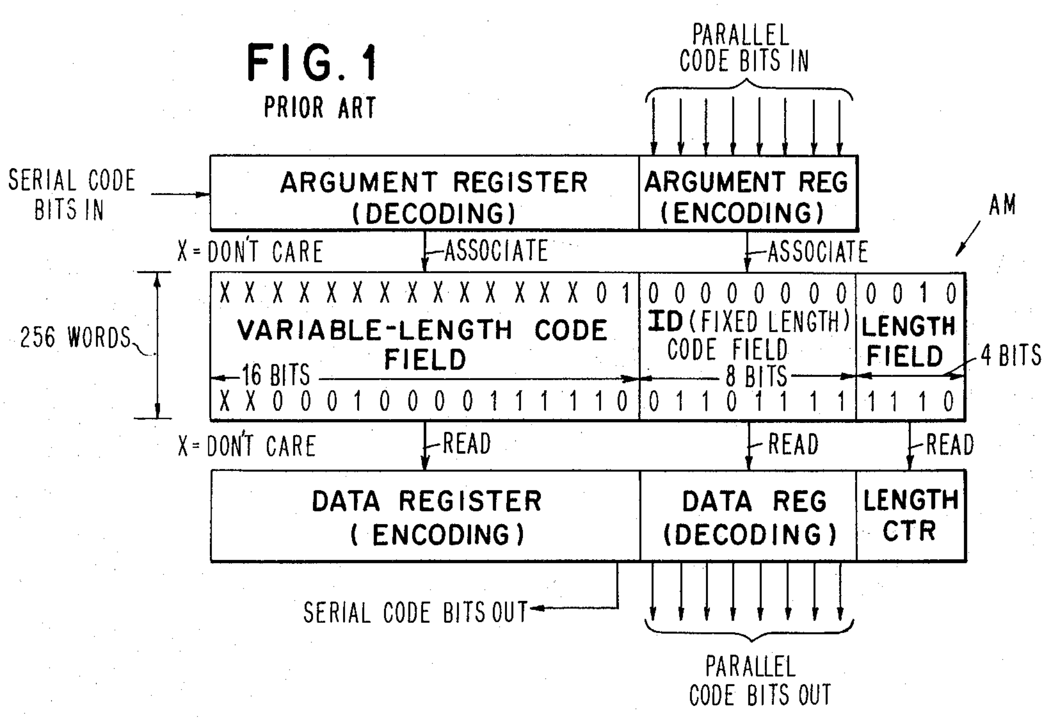
FIG. 1 PRIOR ART
FIG. 1 is a general diagrammatic representation of an associative memory containing three-state memory cells and a length field for performing what are referred to herein as "normal" encoding and decoding operations.

FIGS. 1 — 5 show the basic system disclosed and claimed in the aforesaid Raviv and Wesley application, which must be understood before the COPY feature described hereinafter can be adequately comprehended. In the apparatus of FIGS. 1 — 3B, the associative memory AM has one "word" or row of cells for each possible ID (fixed-length) code bit combination. Thus, assuming that the ID code length is eight bits, or one byte, there are 256 possible code bit combinations; hence 256 words of information are stored at the various addressable locations within the associative memory, as indicated in FIG. 1. The variable length (VL) code field is made long enough to accommodate the VL code of greatest length, which is assumed to be 16 bits long in this particular example. This portion of the associative memory is loaded with variable-length codes which correspond respectively to the fixed-length (ID) codes stored at the same word addresses in the ID field of the memory. The VL codes are prefix-free, no one of these codes constituting the beginning of a longer code bit string.

The variable-length codes are positioned in right-justified fashion so that the significant bits of each code occupy the rightmost positions in the variable-length field. Those memory cells in this field which are not utilized for storing significant bits are set to their "don't care" state, as will be described in greater detail presently. The "don't care" state is represented by an "X" in FIG. 1. Thus, referring to the first row of cells in the variable-length field, there are two significant bits, 1 and 0, and 14 "don't cares" arranged in that order from right to left in this entry. The corresponding ID code in this particular example is assumed to be 00000000. This relationship, of course, would not necessarily hold true for all data bases. The "length" field contains a four-bit entry 0010, which denotes that there are two significant bits in the corresponding variable-length code entry. Similarly, the final entry in this length field indicates that there are 14 significant bits in the final variable-length code entry. It is not necessary that the entries within a field of the associative memory be arranged in any given order relative to one another, so long as each entry is properly aligned with the corresponding entries in other fields.

Any suitable form of associative memory may be employed, provided it has three-state memory cells within its variable-length code storage section. For present purposes, it is satisfactory to employ an associative memory of the kind shown in U.S. Pat. No. 3,317,898 to H. Hellerman, dated May 2, 1967, modified as shown in FIG. 2 of the present drawings to provide a third or "don't care" state in those cells of the memory which require this property.

Figure 2:
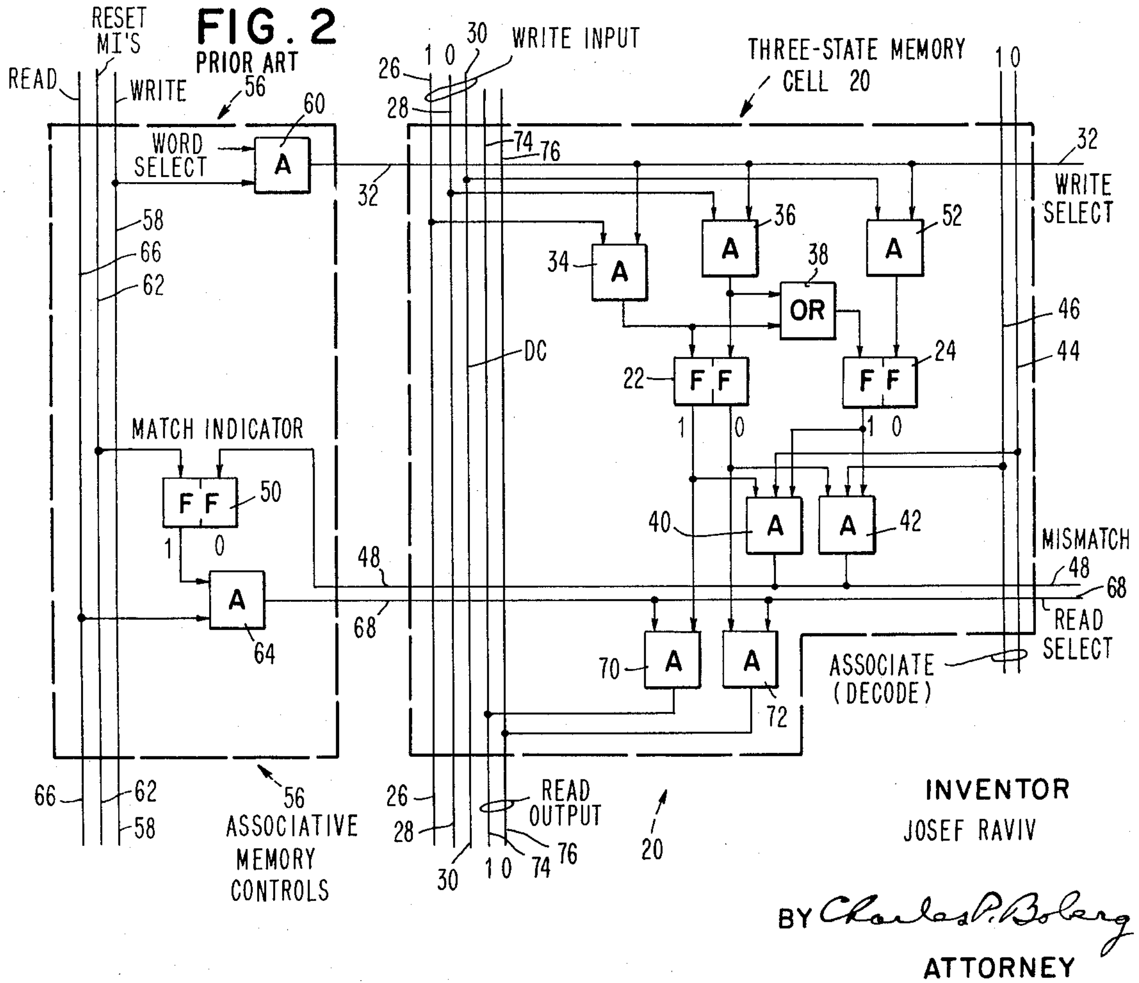
FIG. 2 PRIOR ART
FIG. 2 is a schematic representation of some of the circuitry utilized in the associative memory of FIG. 1 and its related controls, showing the manner in which a three-state memory cell is employed therein.

Referring to FIG. 2, a typical three-state associative memory cell is represented within the dashed rectangle 20. This cell 20 includes flip-flop 22 for storing a binary 1 or binary 0. If the stored bit is significant, another flip-flop 24 is set to its 1 state, but if the stored bit is not significant (i.e., if the cell 20 is in its "don't care" state), the flip-flop 24 is reset to 0. The effect of this action will be explained presently.

To write information into the cell 20, one of three write input lines 26, 28 and 30 for this bit position will be energized in conjunction with the energization of a write select line 32 associated with the particular memory word in which the cell 20 is located. If lines 26 and 32 are simultaneously energized, for example, the coincidence of these signals at the AND gate 34 generates a signal for setting the flip-flop 22 to its 1 state. When lines 28 and 32 are coincidentally excited, a signal is passed by AND gate 36 for setting the flip-flop 22 to its 0 state. Each time a signal is passed through either gate 34 or gate 36 to the flip-flop 22, the same signal also passes through an OR gate 38 and is applied to flip-flop 24 for setting this flip-flop into its 1 state. The 1 output signals of flip-flops 22 and 24 are applied to a three-input AND gate 40. The 0 output from flip-flop 22 and the 1 output from flip-flop 24 are applied to a three-input AND gate 42. The third input to the AND gate 40 comes from a branch of the 0 associate line 44, while the third input to the AND gate 42 comes from a branch of the 1 associate line 46. The associate lines 44 and 46 are selectively pulsed according to whether a search is being made for a 1 or a 0 in the particular bit position under consideration.

The outputs, if any, of the two AND gates 40 and 42 are applied to a mismatch line 48, one such mismatch line being provided for each word of the associative memory. The mismatch line 48, when energized, resets the match indicator 50 for that word to its 0 state. A mismatch can occur if the cell 20 is storing a 0 when the 1 associate line 46 is pulsed, or if the cell 20 is storing 1 at the time when the 0 associate line 44 is pulsed, provided the cell 20 is not in its "don't care" state. The resulting coincidence of input signals at either the AND gate 40 or the AND gate 42 will place an output signal on the mismatch line 48.

To place the cell in the "don't care" state, the DC write input line 30 is energized coincidentally with the energization of the write select line 32. This causes a signal to be passed by an AND gate 52 to reset the flip-flop 24 to its 0 state. With the flip-flop 24 in its 0 state, one of the inputs to each of the AND gates 40 and 42 is removed, thereby disabling both of these gates so that they cannot pass any signals to the mismatch line 48. Hence, when the cell 20 is in its "don't care" state (with its flip-flop 24 set to 0), the cell 20 always will act as through there has been a match, regardless of whether this cell has been interrogated on the 1 or 0 associate line 46 or 44, thereby effectively masking the cell 20 from interrogation.

The associative memory controls are fragmentarily represented to the extent necessary for present purposes within the dashed rectangle 56, FIG. 2. Further details of these controls are disclosed in the aforesaid Hellerman U.S. Pat. No. 3,317,898. When information is to be written into a selected word address of the associative memory, a write line 58 is energized to provide one input to each of a series of write select gates such as 60, of which there is one for each word. If a word select signal is applied to the other input of this gate, the corresponding write select line, such as 32, is energized to condition the memory cells of that word for receiving information from the write input lines such as 26, 28 and 30.

When an "associate" or search operation is to be performed, the match indicators such as 50 for the various words are first reset to their 1 states by a pulse applied to a reset line 62. Then the various associate lines such as 44 and 46 are selectively pulsed for interrogating the related memory cells. If any one or more of the cells in a word generates a mismatch signal on the respective mismatch line such as 48, the match indicator such as 50 for that word is set to 0, thereby removing one input from the read select gate such as 64 for that word and preventing the respective word from being read out in response to the interrogation.

To read out the matching word, the read line 66 is energized. Assuming that the matching word is the one associated with the match indicator 50, FIG. 2, this indicator will receive no mismatch signal and consequently will remain in the 1 state to which it initially was set, and the AND gate 64 therefore will be conditioned to pass the read signal from line 66 to the read select line 68. The signal on line 68 conditions a pair of AND gates such as 70 and 72 for reading the data out of each memory cell such as 20 in the selected memory word. Depending upon the state of the storage flip-flop 22, a signal is passed through one or the other of the AND gates 70 and 72 to the 1 or 0 read output line 74 or 76.

If the cell 20 is in a "don't care" state (flip-flop 24 set to 0), this setting will have no effect upon the readout of the data stored in flip-flop 22. The 1 or 0 value which happens to be stored in flip-flop 22 at that time is read out regardless of whether or not the cell 20 is in its "don't care" state. Other arrangements (to be described hereinafter) are made for disregarding those bits which are read out of the cells that are in their "don't care" state. The "don't care" setting merely disables the mismatch gates 40 and 42 of the cell. It does not affect the readout gates 70 and 72 of that cell.

Figure 3A:
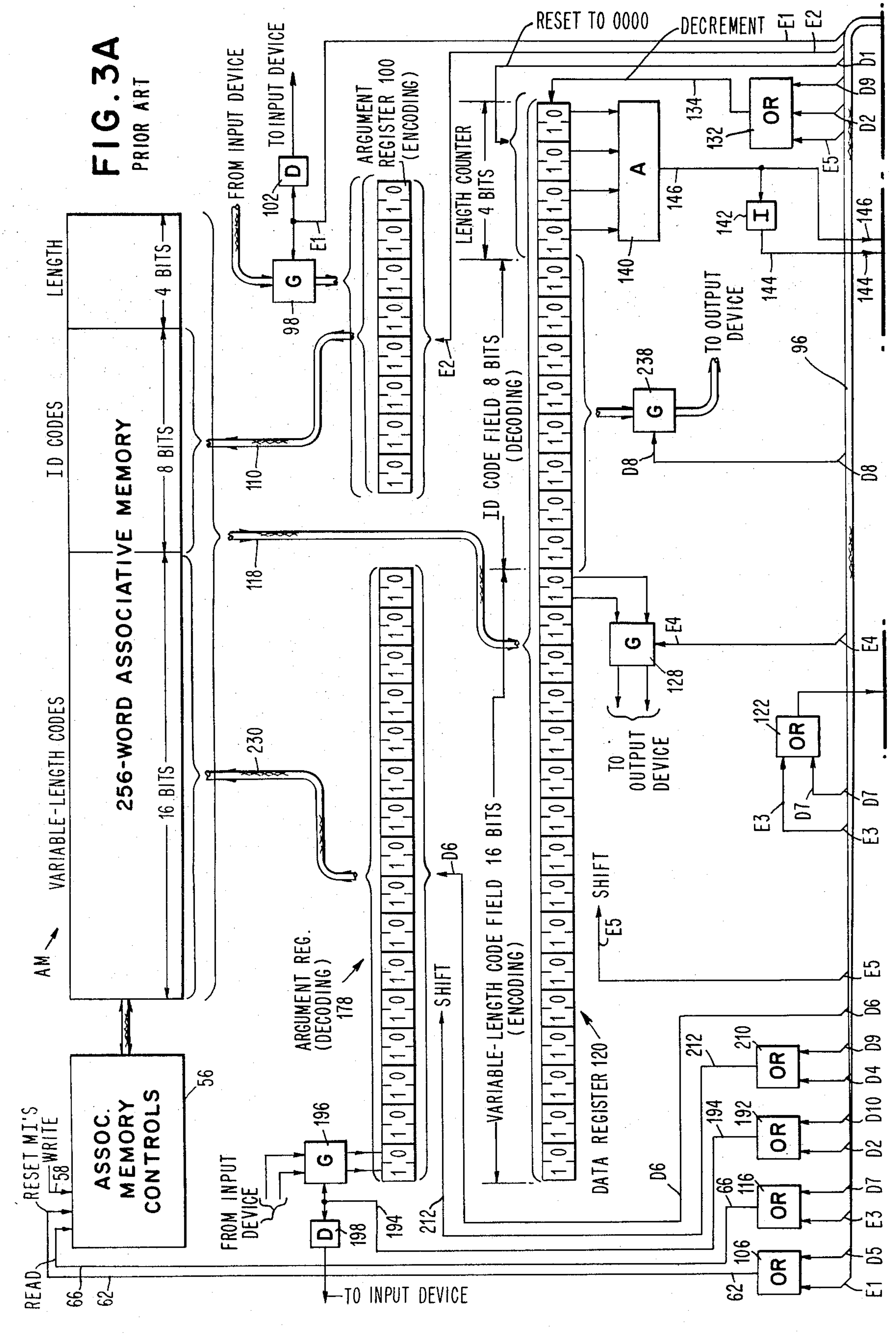
FIGS. 3A and 3B, when assembled, constitute a more detailed circuit diagram of an associative memory and its related controls for carrying out the encoding and decoding operations shown generally in FIG. 1.
Figure 4:
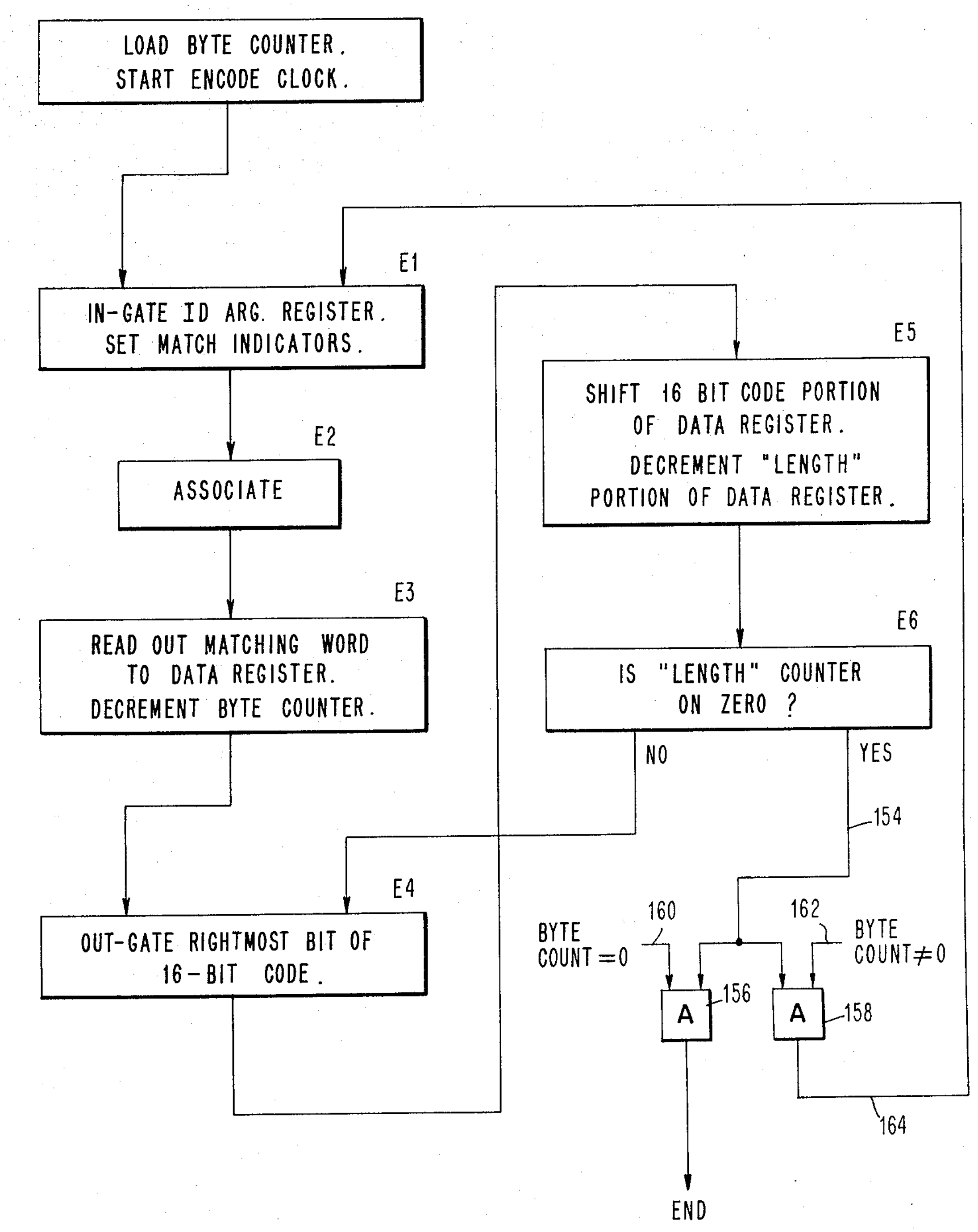
FIG. 4 PRIOR ART
FIG. 4 is a flowchart depicting the operation of the apparatus shown in FIGS. 3A and 3B while it is in its encoding mode.
Figure 5:
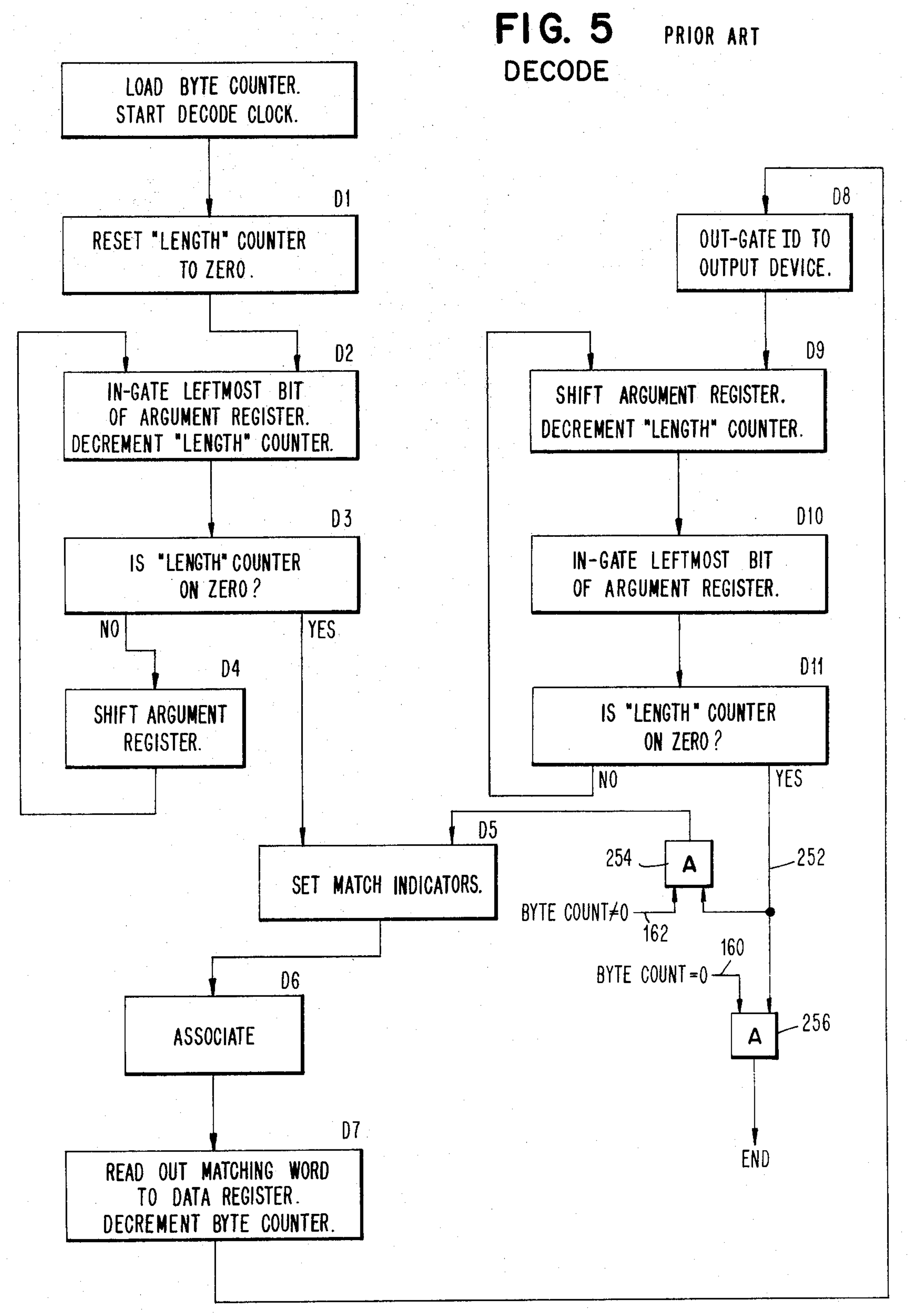
FIG. 5 PRIOR ART
FIG. 5 is a flowchart depicting the operation of the apparatus shown in FIGS. 3A and 3B while it is in its decoding mode.

The operation of the apparatus shown in FIGS. 3A and 3B will be described with reference to the flowcharts shown in FIGS. 4 and 5. Consideration first will be given to the encoding operation, in which a fixed-length ID code is converted to a corresponding variable-length code. It is assumed that the associative memory AM, FIG. 3A, previously has been loaded with the necessary ID and variable-length code entries, together with their related "length" entries for denoting the number of significant bits in each variable-length code bit string.

As mentioned hereinabove, it is assumed by way of example that the ID codes have a length of eight bits, i.e., one byte, and that the variable-length codes may have any length from one to sixteen bits. To represent a length count of up to sixteen bits, with 0000 representing 16, a four-bit length representation will suffice. Accordingly, the associative memory AM, FIG. 3A, has a 16-bit field for storing variable-length codes, an 8-bit field for storing the ID codes, each of which is one byte in length, and a 4-bit length field, each entry in which measures the number of significant bits in the corresponding variable-length code. In the embodiment of FIGS. 3A and 3B, it is further assumed that all possible ID byte configurations (256 in all) will be accommodated by the associative memory AM.

Figure 3B:
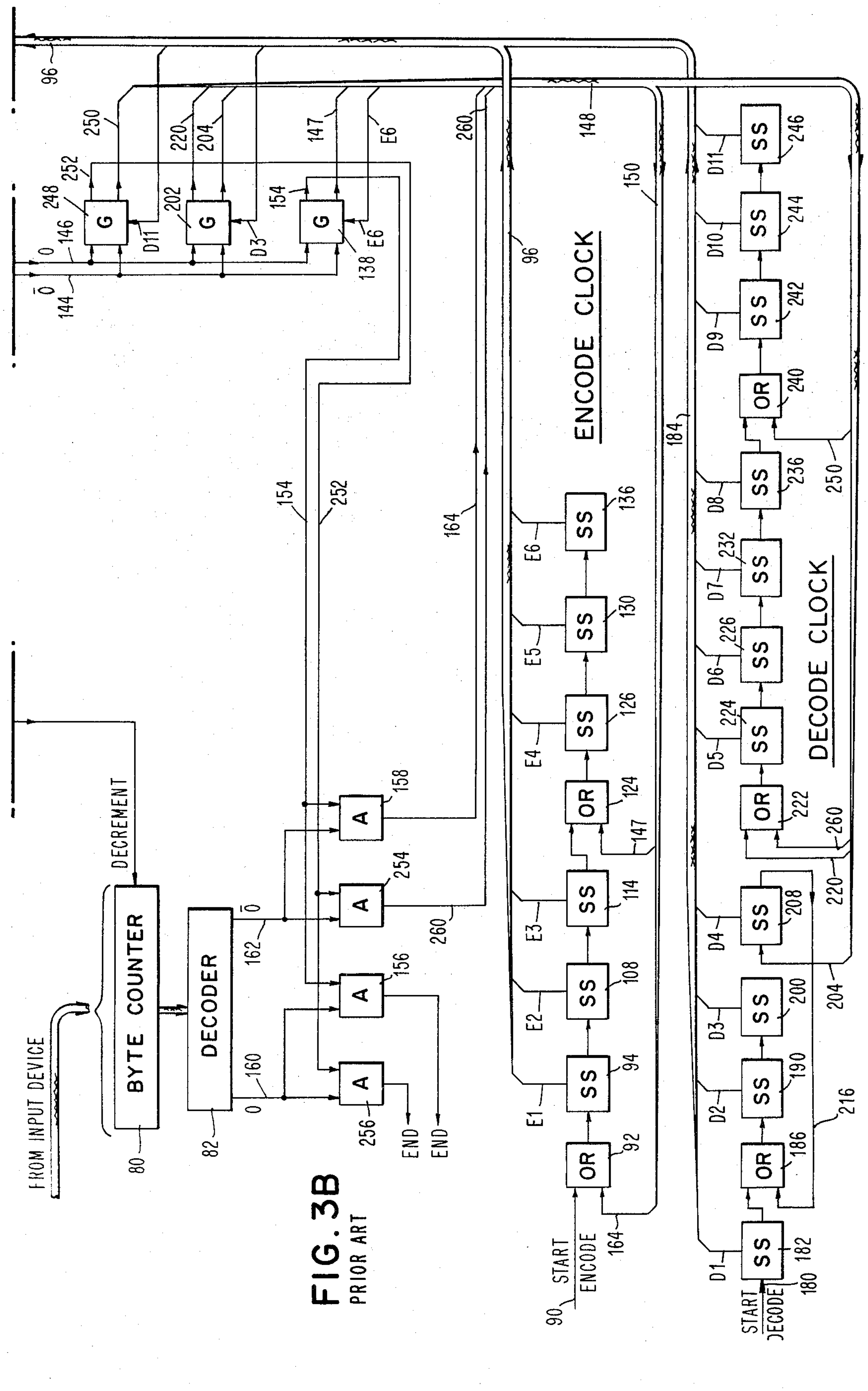
FIG. 3B PRIOR ART

Before the encoding operation commences, the number of ID bytes to be encoded is entered into the byte counter 80, FIG. 3B. A data source or input device which will supply this number of bytes is assumed. If the input device operates at a different speed than the associative memory, appropriate buffering may be employed. The setting of the byte counter 80 is progressively decremented as the ID bytes are encoded, and the current setting is decoded to a "zero" or "not zero" output by a decoder 82. A zero output from decoder 82 terminates the encoding operation. This will be explained in greater detail hereinafter.

In describing the encoding operation, reference will be made to FIG. 4 in conjunction with FIGS. 3A and 3B. It should be understood that the apparatus schematically shown in FIGS. 3A and 3B is merely an illustrative embodiment and is not necessarily the form in which the invention would be fabricated for commercial use. The encoding operation is initiated by applying a "start" pulse on a wire 90 which leads to an "encode" clock circuit. The start pulse passes through an OR circuit 92 to a single-shot 94, causing it to be turned on for generating a pulse on wire E1 which passes through a cable 96, FIGS. 3B and 3A. The pulse on wire E1 is applied to a gate 98, FIG. 3A, enabling it to pass a byte from the input device (not shown) to the ID argument register 100. The argument register 100 now holds the byte that currently is to be encoded. The same pulse also is extended from wire E1 through a delay circuit 102 to the input device for causing it to place the next ID code byte on the input lines leading to the gate 98. The E1 pulse also extends through an OR circuit 106, FIG. 3A to the wire 62 (also shown in FIG. 2), energization of which resets the match indicators in the associative memory controls 56 to their 1 state. The apparatus is now in condition to perform the encoding function.

When single-shot 94, FIG. 3B goes off, it turns the single-shot 108 on. This produces a pulse on a wire E2 that extends through cable 96 to the argument register 100 for placing a pattern of 1's and 0's on the associate lines 110 according to the setting of the ID argument register 100. These associative lines 110 perform a function similar to that of the associate lines 44 and 46 described hereinabove with reference to FIG. 2, except that they are in this instance applied to memory cells in the ID code section of the associative memory AM. This causes the various ID codes to be searched in order to find the word containing the variable-length code which corresponds to the ID code in the argument register 100.

When the single-shot 108, FIG. 3B turns off, it turns on the next single-shot 114, which generates a pulse on wire E3 in cable 96. The pulse on wire E3 is extended through an OR circuit 116, FIG. 3A, to the read line 66 of the associative memory controls 56, FIGS. 3A and 2. Pulsing of the line 62 effects a readout of the matching word in the associative memory through cable 118, FIG. 3A, to the data register 120, thereby causing the information stored in the various fields of this matching word to be entered into the data register 120. This information includes the 16 bits in the variable-length code section of the matching word plus the 8 bits in the fixed-length ID section of the word and the 4 bits in the length field of this word. At the same time that this action occurs, the pulse on wire E3 also is applied through an OR circuit 122 to decrement the byte counter 80.

When the single-shot 114 goes off, it sends a pulse through the OR circuit 124 to turn on the single-shot 126. This puts a pulse on line E4 which extends to gate 128, FIG. 3A, thereby conditioning gate 128 to pass the rightmost bit from the variable-length field of data register 120 to the output device.

When the rightmost bit of the variable-length code has been outgated in this fashion, it is necessary to shift the contents of the variable-length field in data register 120 to the right by one bit-storing position. This is accomplished when single-shot 126 goes off, causing single-shot 130 to be turned on for generating a pulse on wire E5. This pulse on wire E5 is applied to an appropriate shifting means (not shown) to effect a 1-bit rightward shift of the variable-length code bits stored in the data register 120, as indicated by the arrow on line E5 in FIG. 3A.

The portion of the data register 120 which stores the 4-bit length code is utilized as a length counter. For each rightward shift of the variable-length code digits stored in register 120, this length count is reduced by 1. Such decrementing of the length counter is accomplished in the present instance by the E5 pulse passing through an OR circuit 132 to a line 134, which leads to the means (not shown) for decrementing the value stored in the length counter (last 4 bits of data register 120).

A test now is made to determine whether the length count has been reduced to 0, that is to say, whether all of the significant bits of the current variable-length code have been shifted out of the data register 120. When single-shot 130 goes off, FIG. 3B, single-shot 136 goes on, placing a pulse on wire E6 which leads to gate 138, FIG. 3B. Zero (0) and not-zero ($\bar{0}$) input lines are extended to gate 138 from AND circuit 140, to which the 0 outputs in any of the four orders of the length counter are applied. If the AND circuit 140 has no output, meaning that at least one of the bits in the length counter is a 1, an inverter 142 applies a voltage on the not-zero input line 144 to gate 138. For an all-zero setting of the length counter, the zero input line 146 to gate 138 is energized. Assuming in the present instance that more than one code bit is to be shifted out of the data register 120, the gate 138 receives a not-zero input, thereby causing an output wire 147 leading from gate 138 to be energized. Wire 147 passes through cables 148 and 150 to the OR circuit 124, whereby the not-zero length count pulse is applied to single-shot 126. This initiates a new cycle of operations involving the successive energization of single-shots 126, 130 and 136. During this action, there will occur the readout of another bit from the rightmost position in the variable-length code field of data register 120, a resulting one-bit rightward shift of the remaining bits in this field and a testing of the length-counter setting to see whether it has been reduced to all zeros.

The steps of the operation which involve the energization of single-shots 126, 130 and 136 and the resultant pulsing of wires E4, E5 and E6 is repeated as often as necessary (FIG. 4) until the length count reduces to 0. At this point, the last significant bit has been read out of the variable-length code field of data register 120, and the remaining bits in this field are of no interest, having come from memory cells which were in their "don't care" state or else having been introduced into the register during the shifting process. The operation now exits from the right shift subroutine. When gate 138, FIG. 3B, is activated by the pulse on wire E6, the 0 input line 146 will have been energized in response to an all-zero setting of the length counter, and the output line 154 from gate 138 accordingly is energized to apply an input to each of the AND circuits 156 and 158, FIG. 3B. A second input to AND circuit 156 is supplied by a 0 output line 160 from decoder 82 only if the setting of the byte counter 80 has been reduced to 0. If the byte counter of the setting 80 is not 0, the decoder supplies an output on line 162 to the AND circuit 158. Assuming in this instance that the byte counter setting is not zero, meaning that there are additional ID bytes to be decoded, the coincidence of inputs at the AND circuit 158 places a pulse on wire 164 which passes through cables 148 and 150 to the OR circuit 92, thereby extending a pulse through this OR circuit to a single-shot 94. This commences a new encoding cycle as indicated by the steps E1 to E6 in FIG. 4

The above described encoding cycle is repeated as often as necessary to bring the byte counter setting down to zero. When the last ID byte has been encoded, and the setting of byte counter 80 becomes zero, the decoder 82 furnishes a zero output to the AND gate 156. Then, when the length-counter setting becomes zero, indicating that the last of the encoded digits has been read out of the data register 120, the coincidence of excitations on the AND gate 156 generates a pulse for ending the operation of the system.

When the apparatus is operated in its "decode" mode, the bits of the variable-length code which are to be decoded are fed serially into an argument register 178, FIG. 3A, which has 16 bit storage positions. The number of variable-length codes which will be stored in this register 178 at any one time is indeterminate. At the start of each decoding operation, however, it is necessary that the first bit in a new code be located in the rightmost position of argument register 178. This is accomplished through means which will be described hereinafter.

The decoding operation of the system will be described with reference to FIGS. 3A, 3B and 5. In the flowchart FIG. 5, the various steps D1, D2, etc., correspond to actions produced by pulses on various wires D1, D2, etc., as described hereinafter. The decoding operation is started by applying a pulse on the "-start" wire 180 to activate the single-shot 182 in the decode clock. As single-shot 182 is turned on, it extends a pulse through wire D1 and cables 184 and 96, FIGS. 3B and 3A, to the resetting means for the length counter comprising the right-most four bit storing positions in the data register 120. The effect of the pulse on wire D1 is to reset the length counter to its all-zeros state, and thereby condition the length counter for counting the first 16 bits of information which will be fed serially into the argument register 178. It is necessary to insure that 16 bits of new information have been entered into the argument register 178 before decoding operations can commence, and the length counter is instrumental in making this determination.

When single-shot 182 goes off, it sends a pulse through the OR circuit 186 to single-shot 190, which generates a pulse on wire D2. The pulse on wire D2 passes through an OR circuit 192, FIG. 3A, and a wire 194 to a gate 196, thereby enabling gate 196 to pass the first bit from the input device into the leftmost bit storing position of argument register 178. The pulse on wire 194 also extends through a delay device 198 to the input device for causing the next bit to become available for transfer. The bit which just was entered into the argument register 178 eventually must be shifted to the right until it occupies the rightmost bit storing position in that register. The D2 pulse also extends through OR circuit 132, FIG. 3A to the length counter decrementing line 134, causing the length count to be decremented by 1. If the length counter initially stood at 0000, the first decrementing action will change this setting to 1111.

When single-shot 190 goes off, FIG. 3B, single-shot 200 is turned on, generating a pulse on wire D3. This D3 pulse is applied to a gate 202 which receives its input from the not-zero wire 144 or the 0 wire 146 associated with the length counter. If the length count does not stand at 0, as is true in the present instance, a signal passes from the wire 144 through gate 202 to wire 204, which leads to a single-shot 208, FIG. 3B.

When single-shot 208 turns on, it puts a pulse on the wire D4, which pulse then passes through an OR circuit 210, FIG. 3A, to a wire 212 which leads to the shifting means (not shown) of the argument register 178. Such action causes the contents of the argument register 178 to be shifted right by 1 bit storing position, so that the leftmost bit storing position of this register will be ready to receive a new bit entry.

When single-shot 208 goes off, it sends a pulse through wire 216 and OR circuit 186 to single-shot 190, turning the latter on. The sequence of steps D2 and D3, FIG. 5, now is repeated as the single-shots 190 and 200 and are successively energized. At step D3, the setting of the length counter again is tested, and if this setting still is not 0000, single-shot 208 is turned on for executing step D4, whereby the contents of the argument register 178 are shifted right.

This sequence of entering a bit of information into the argument register 178, decrementing the length counter, testing the length counter setting and right-shifting the contents of the argument register 178 is repeated until the test at step D3 finally shows that the length counter setting is 0000. This indicates that the first 16 bits of information have been fed into the argument register 178 and that the first bit of the first variable-length code is now in the extreme right-hand position of this register. At this point, when the D3 pulse is applied to the gate 202, FIG. 3B, energization is extended from the 0 output line 146 of the length counter through gate 202 to a wire 220 which leads to the OR circuit 222, FIG. 3B, through which the energization is further extended to a single-shot 224. As the single-shot 224 is turned on, it pulses a wire D5 which extends through cables 184 and 96 and OR circuit 106, FIG. 3A to the match indicator reset line 62, thereby resetting the match indicators of the associative memory controls 56, FIGS. 3A and 2, to their 1 states. When single-shot 224 goes off, it causes single-shot 226 to be turned on for pulsing the wire D6. This applies a pulse to argument register 178, FIG. 3A for initiating an "associate" operation wherein the contents of the argument register 178 are transmitted through the associate lines 230 to the variable length code field of the associative memory AM. The associate lines 230 include lines such as 44 and 46 shown in FIG. 2 for interrogating the various three-state memory cells which store the variable-length codes in the associative memory. Those memory cells which are in their "don't care" states are incapable of generating any mismatch signals. Those memory cells which are not in their "don't care" states and which do not store bits that match the signals on the interrogation lines 230, FIG. 3A, will generate mismatch signals for setting their respective match indicators to 0.

It has been explained above that the variable length codes are prefix-free. Hence, the code bits in the argument register 178 will match only one code word in the associative memory AM, and this will be the code word whose significant bits exactly match the bits of the variable-length code string positioned at the right end of the argument register 178. This is true regardless of how many other variable length codes are stored in other positions of the argument register 178.

When single-shot 226 goes off, single shot 226 is turned on to generate a pulse on wire D7, which extends through cables 184 and 96 to OR circuit 116, FIG. 3A. This pulse is then applied through OR circuit 116 to the read line 66 of the associative memory controls 56. The match indicator which is then in its 1 state will indicate the address of the matching word in the associative memory, and this matching word is read out of the associative memory through the output lines 118 to the data register 120. This matching word contains the fixed-length ID code which is sought, and it also contains a length count. These items of information are stored in the appropriate portions of the data register 120. The D7 pulse also is passed through the OR circuit 122, FIG. 3A, to decrement the byte counter 80, FIG. 3B.

When the single-shot 232 goes off, it turns on a single-shot 236. This produces a pulse on wire D8, which pulse is applied to a gate 238, FIG. 3A, enabling it to out-gate the 8-bit identity code portion of the information stored in the data register 120 to the output device.

At this time, the 4-bit length counter (right-hand four positions of data register 120, FIG. 3A) registers the number of significant bits contained in the variable length code that was just decoded. The contents of the argument register must now be right-shifted by this amount in order to bring the first bit of the next succeeding variable-length code into the rightmost position of this argument register. This is done in the following manner:

When single-shot 236 goes off, it transmits a pulse through the OR circuit 240 for turning single-shot 242 on. This produces a pulse on wire D9, FIGS 3B and 3A, which passes through the OR circuit 210 to the right shift line 212. As a result of this action, the contents of the argument register 178 are shifted one bit to the right. At the same time, the pulse on wire D9 extends through the OR circuit 132, FIG. 3A to the length-counter decrementing wire 134, thereby causing the length count to be decremented by 1.

When single-shot 242 goes off, it causes single-shot 244 to be turned on, thereby producing a pulse on wire D10. This pulse passes through OR circuit 192 and wire 194 to the gate 196, FIG. 3A for in-gating the next bit into the leftmost position of the argument register 178. At the same time, a pulse extends through the delay unit 198 to the input device so that it can make a new bit available on the input side of the gate 196.

When single-shot 244 goes off, it turns on the single-shot 246. This places a pulse on line D11 which extends to gate 248, FIG. 3B, causing the condition of the length counter to be tested. If the length count has not yet been reduced to 0, the gate 248 passes a pulse from the not-zero line 144 to a wire 250 leading to the OR circuit 240, FIG. 3B. As a result of this, the single-shot 242 again is turned on to re-initiate the sequence of steps D9, D10 and D11, FIG. 5. Thus, the contents of the argument register 178 are progressively shifted to the right until the current length count is reduced to 0. When this condition is attained, the bit in the lowermost order in the next succeeding variable-length code will have been positioned at the right end of the argument register 178, and the apparatus then is ready to perform a new association on this variable-length code.

Referring again to FIG. 3B, when the length count reduces to 0 and single-shot 246 is turned on, energization is extended from the 0 line 146 through gate 248 to a line 252 which supplies an input to each of the AND circuits 254 and 256. If the byte counter 80 is still in a non-zero setting at this time, the decoder 82 furnishes a signal on line 162 which passes through the AND circuit 254 to a wire 260 and thence through the OR circuit 222, FIG. 3B to the single-shot 224, turning this single shot on. As a result of this action, the steps designated D5 through D11 in the flow chart, FIG. 5, are repeated. Such action recurs until the byte counter setting stands at 0. Then, when single-shot 246, FIG. 3B goes on, the gate 256 becomes active to generate a signal for ending the decode operation.

"COPY" Feature

The encoding-decoding arrangement illustrated in FIGS. 1–5 utilizes an associative memory having a word-storing address for each possible ID code and its matching variable-length (VL) code. In the example chosen for illustration herein, the ID codes have a length of 1 byte (8 bits), and the associative memory therefore must have a capacity of 256 words in order to accommodate all possible byte configurations. This will achieve the maximum data compaction. There are many situations, however, in which it may be considered desirable to sacrifice a small amount of overall data compaction in order to achieve a large saving in the cost of the memory. Analysis of the data bases that are likely to be encountered in practice may lead to the conclusion, for example, that very little data compaction would be lost if, say, only the 150 most frequently occurring ID codes were converted into unique variable-length codes. The remaining 156 ID codes then could be handled without the usual encoding and decoding, these being the codes which will occur far less frequently than the other 150 codes. The longer variable-length codes are assigned to ID code bit strings which occur less frequently; hence relatively little compaction is achieved by using them. Whenever one of these less frequent ID codes is encountered, it could be suitably identified (as described herein) and merely "copied" by the system without the normal coding. This mode of operation is referred to herein as the "COPY" mode.

To accommodate the COPY mode of operation, the system illustrated in FIGS. 1–5 is modified as shown in FIGS. 6–10. A comparison of FIG. 6 with FIG. 1 will indicate in a general way the modifications that are required. In this embodiment the associative memory AM', FIG. 6, has a storage capacitory of 150 words (one for each matched pair of variable-length and ID codes) plus one additional word which contains a COPY code in its variable-length field. The contents of the ID field in this last word are immaterial so long as they are not identical with any of the ID codes contained in the 150 matching words. The associative memory controls (to be described subsequently herein) are so arranged that if no match is obtained on any of the ID codes stored in the 150 matching words of the associative memory during an encoding operation, the COPY code then is automatically generated as the variable-length code output. The final encoded output, when the apparatus is operating in its COPY mode, is a bit string consisting of the COPY code bits followed immediately by the bits of the ID code. This, of course, will provide a code bit string that is longer than the normal ID code bit string, but since this occurs infrequently, the overall data compaction is not significantly affected.

The size of the variable-length code field may be selected to accommodate the longest variable-length code that can occur among those words which are subject to the normal coding process. In this particular example, it is assumed for the sake of illustration that a variable-length code field 9 bits long will accommodate all of these words. Therefore, a saving of seven memory cells per word is realized by using this scheme. Thus, by employing the COPY feature, a saving is effected not only in the number of words which must be stored by the associative memory AM', but also in the number of bits which are contained in each such word. Use of the COPY feature, therefore, will permit a satisfactory degree of DATA compaction while requiring an associative memory of only modest size.

The COPY code does not necessarily require the maximum number of significant bits. With respect to the other stored variable-length codes, however, it must be prefix-free. In effect, the COPY code represents all of the 156 ID codes which, in the present example, are handled without the normal coding process. This group of codes, as an entity, may be ranked in order of frequency along with the remaining 150 ID codes, and the frequency with which members of this code group occur will determine the length of the COPY code used to represent them collectively. Under these circumstances, the COPY code may have a length (i.e., number of significant bits) which is considerably less than the maximum 9-bit length for VL codes.

Figure 6:
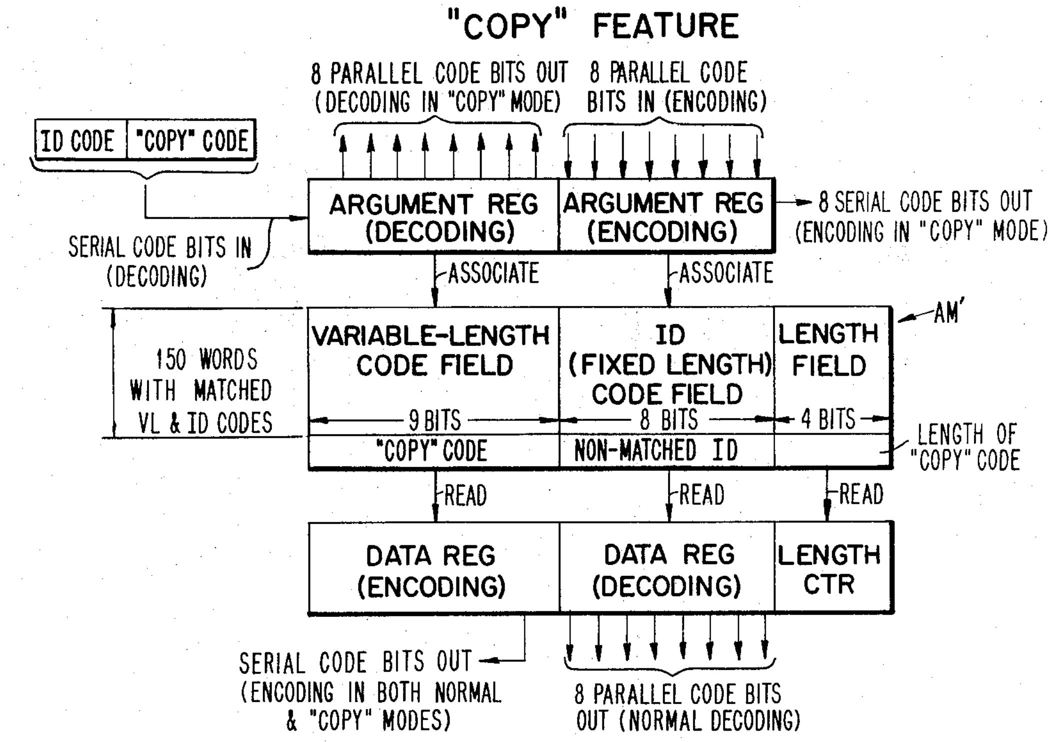
FIG. 6 is a diagram similar to FIG. 1 showing the modifications effected by the present invention in order to provide the "COPY" feature.

When the apparatus shown in FIG. 6 is operating as a decoder, the incoming codes (which in some instances may include combinations of COPY and ID codes) are fed serially into the VL argument register. Each COPY code initiates a special operation for causing the bits of the COPY code to be shifted out of the argument register and for bringing the following 8 bits of the ID code into the rightmost 8 positions of this argument register. These 8 bits of the ID code then are read out in parallel from the VL argument register, instead of being read out from the decoding data register in the normal fashion. Following this, the ID code is shifted out of the VL argument register (where it would not normally be stored) in order to bring in the next succeeding VL code.

During an encoding operation, if the ID code in the argument register does not find a matching ID code in the associative memory AM', a special operation takes place whereby the COPY code is read from the associative memory into the encoding data register, from which the bits of this COPY code then are read out serially. Immediately following this, the 8 bits of the ID code in the argument register are read out serially and are appended to the string of COPY code bits to provide a composite COPY-ID code bit string of the kind discussed hereinabove.

Figure 7:
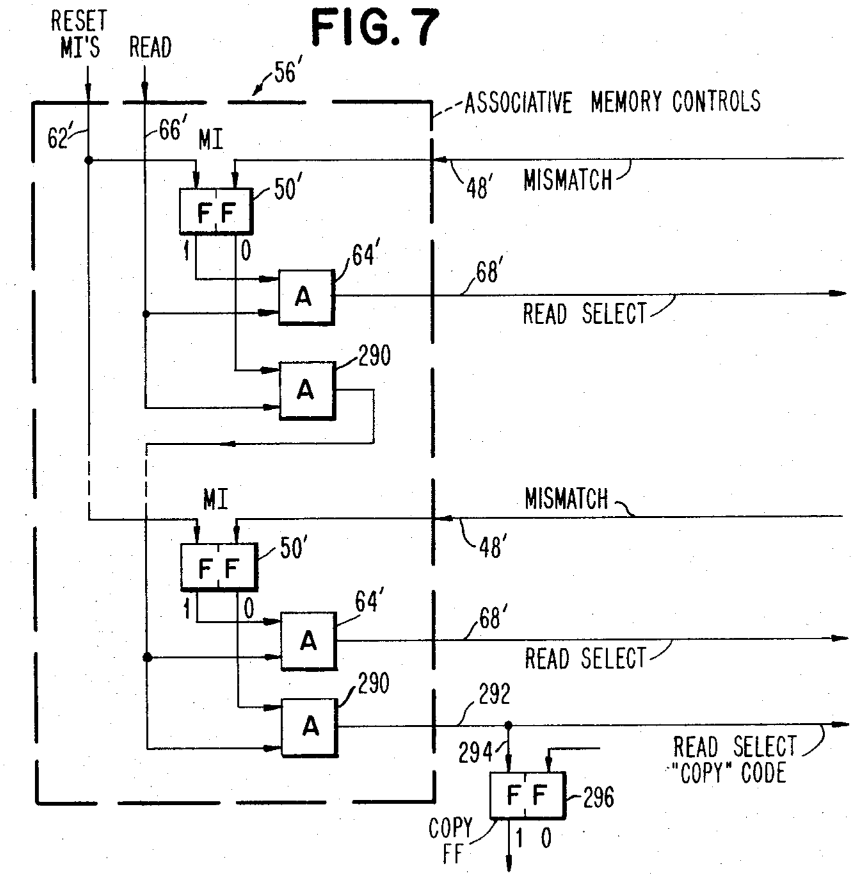
FIG. 7 represents a portion of the associative memory control circuitry arranged to include the COPY feature.

FIG. 7 illustrates a portion of the circuitry in the associative memory controls 56' for the modified system embodying the invention. In this figure, as in the related FIGS. 6 and 8A–10, those elements which correspond to elements of the system shown in FIGS. 1–5 will bear similar reference numbers, except for the addition of a prime (') to each such reference number in the present system. In the control scheme shown in FIG. 7, a mismatch line 48' and match indicator 50' are assigned to each of the words in associative memory AM', FIG. 6, except the one containing the COPY code. Any argument code which does not correspond to any of the 150 words having matched VL and ID code portions (FIG. 6) is assumed to be in the group of codes identified collectively by the COPY code. During an encoding operation, if the ID argument code does not match any of the words having match indicators 50' associated therewith, all of these match indicators are set to their 0 states. This causes a circuit to be extended from read line 66', FIG. 7, through a series of AND circuits 290 (each of which receives an input from the 0 output side of its respective match indicator 50') to a read select line 292 for the COPY code, thereby causing the COPY code to be read out to the data register as the first portion of the encoded signal. At the same time, energization is applied through the wires 292 and 294 to a COPY flip-flop 296 for setting the same to its 1 state. As will be explained in greater detail presently, this action is effective to cause the ID code bits stored in the argument register to be read out serially as the second portion of the encoded signal. Hence, the entry of a non-matching ID code into the argument register during an encoding operation will produce a composite code bit string consisting of a COPY code followed by the ID code. It should be noted that whether the ID code does or does not match the ID portion of the word containing the COPY code is immaterial. The criterion is whether it does or does not match any of the ID codes stored in the other words of the associative memory AM'.

During a decoding operation, the variable-length code which is used as an argument will either match one of the 150 words containing matching VL and ID codes in the memory AM' or it will match the COPY code stored therein. If the argument is a COPY code, all of the mismatch indicators 50', FIG. 7 are set to their 0 states, and the read circuit is extended from line 66' through the AND circuits 290 and wires 292 and 294 to the COPY flip-flop 296, setting it to its 1 state. During a decoding operation, this is effective to shift the COPY code bits out of the argument register and bring the bits of the succeeding ID code into a position where they can be read directly out of the argument register, as indicated in FIG. 6.

Figure 8A:
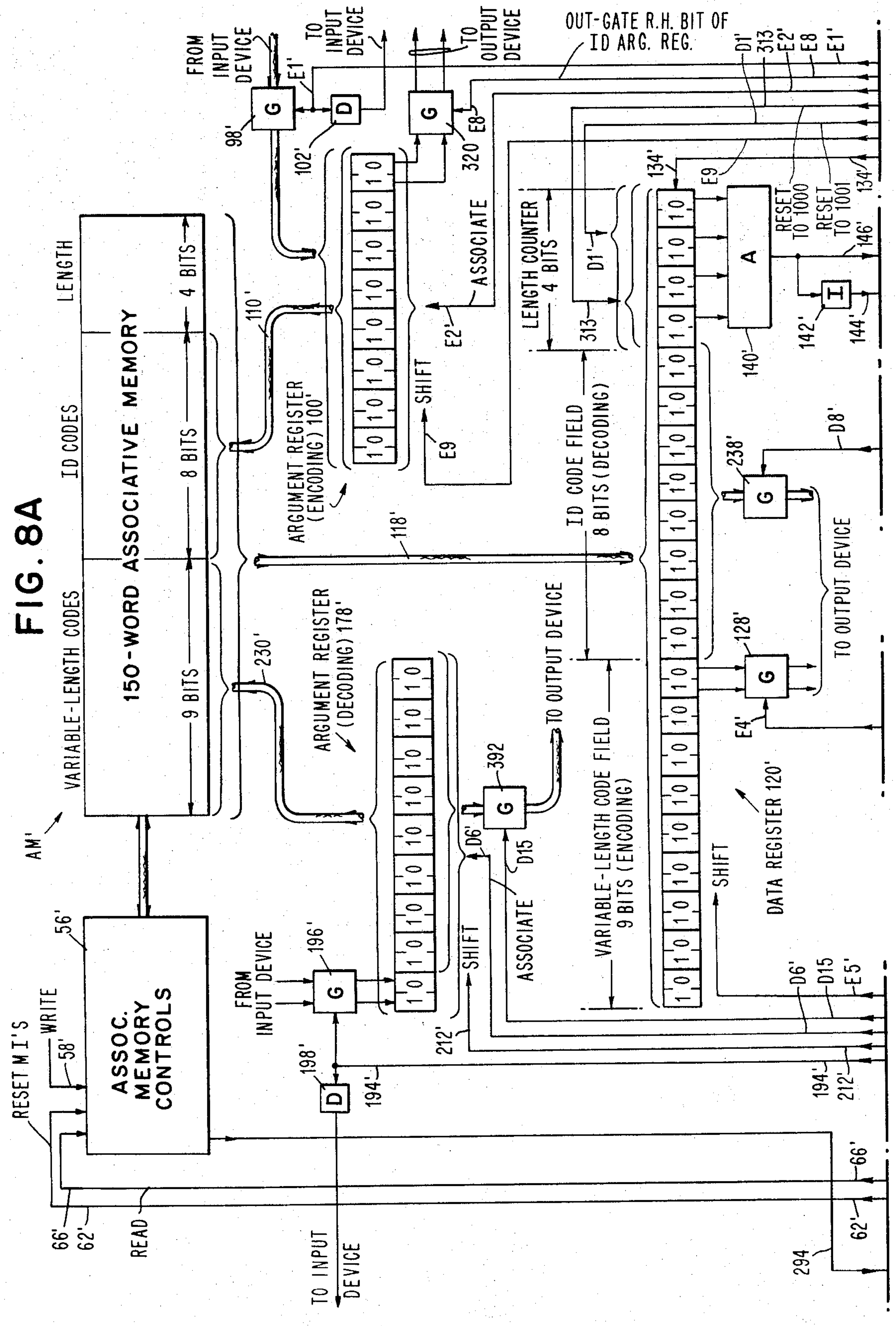
FIGS. 8A, 8B and 8C, when assembled, constitute a circuit diagram of an apparatus utilizing a modified associative memory of reduced size embodying the aforesaid COPY feature.
Figure 8B:
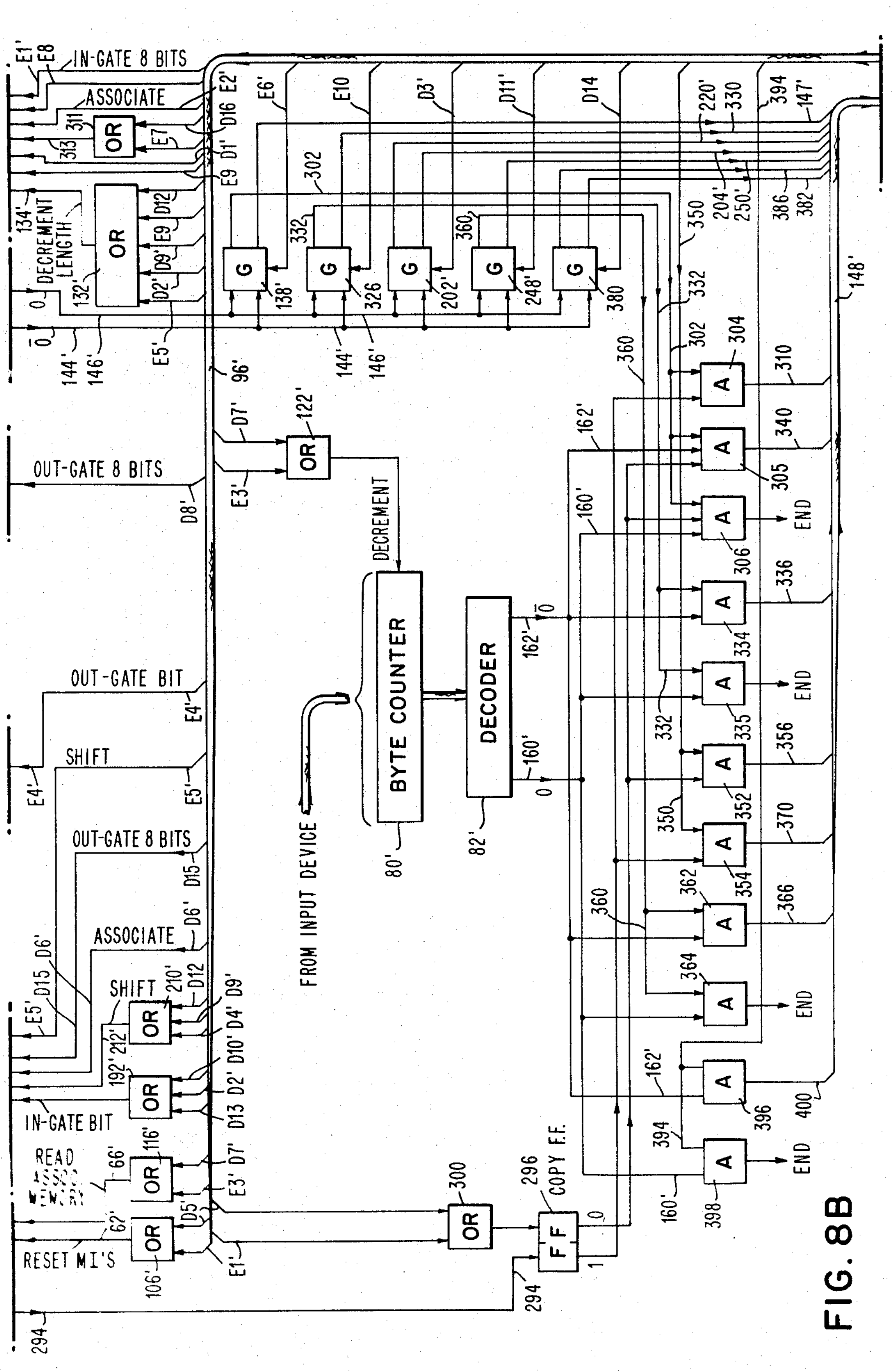
Figure 8C:
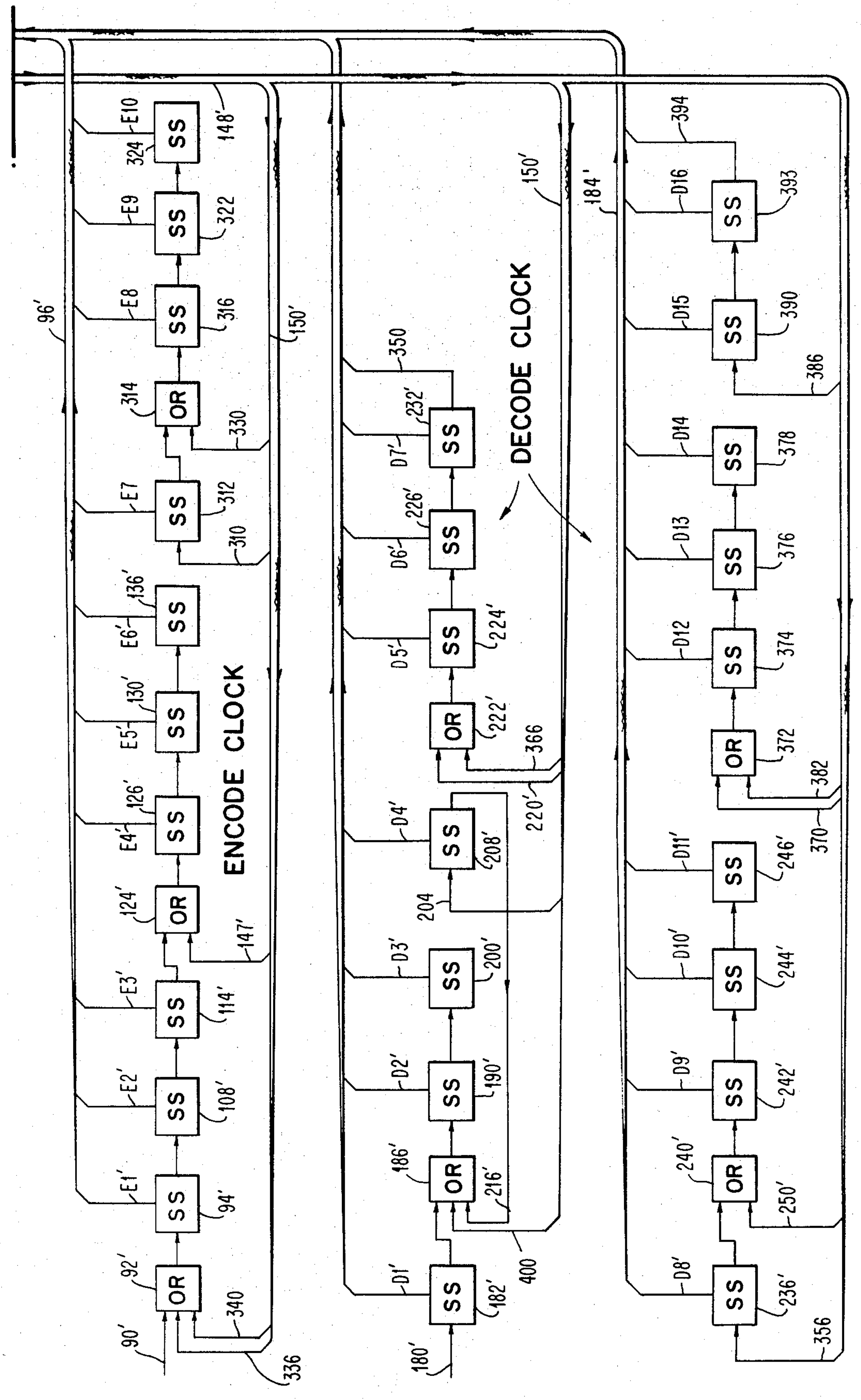
Figure 9:
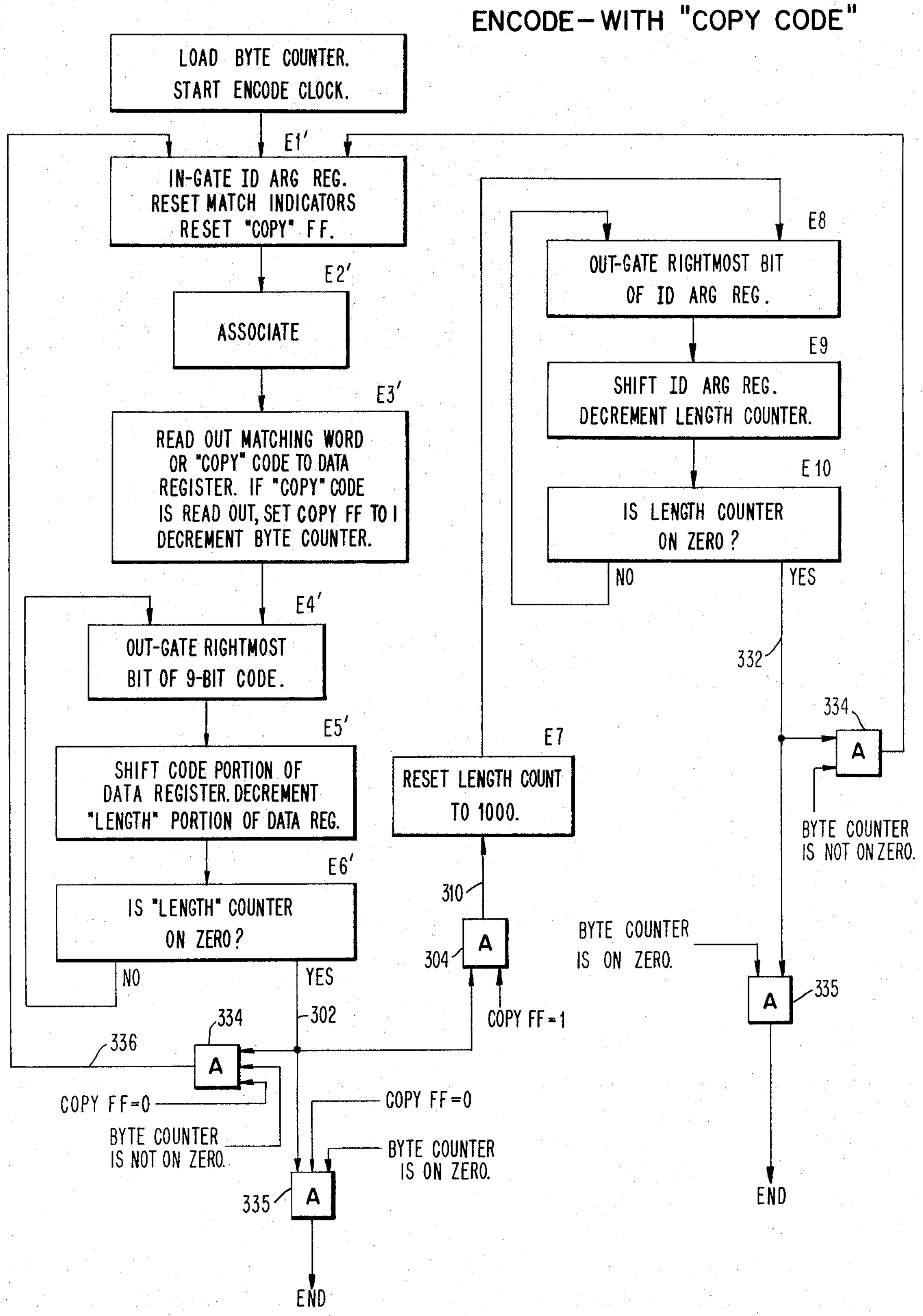
FIG. 9 is a flowchart depicting the operation of the apparatus shown in FIGS. 8A to 8C while it is in its encoding mode.
Figure 10:
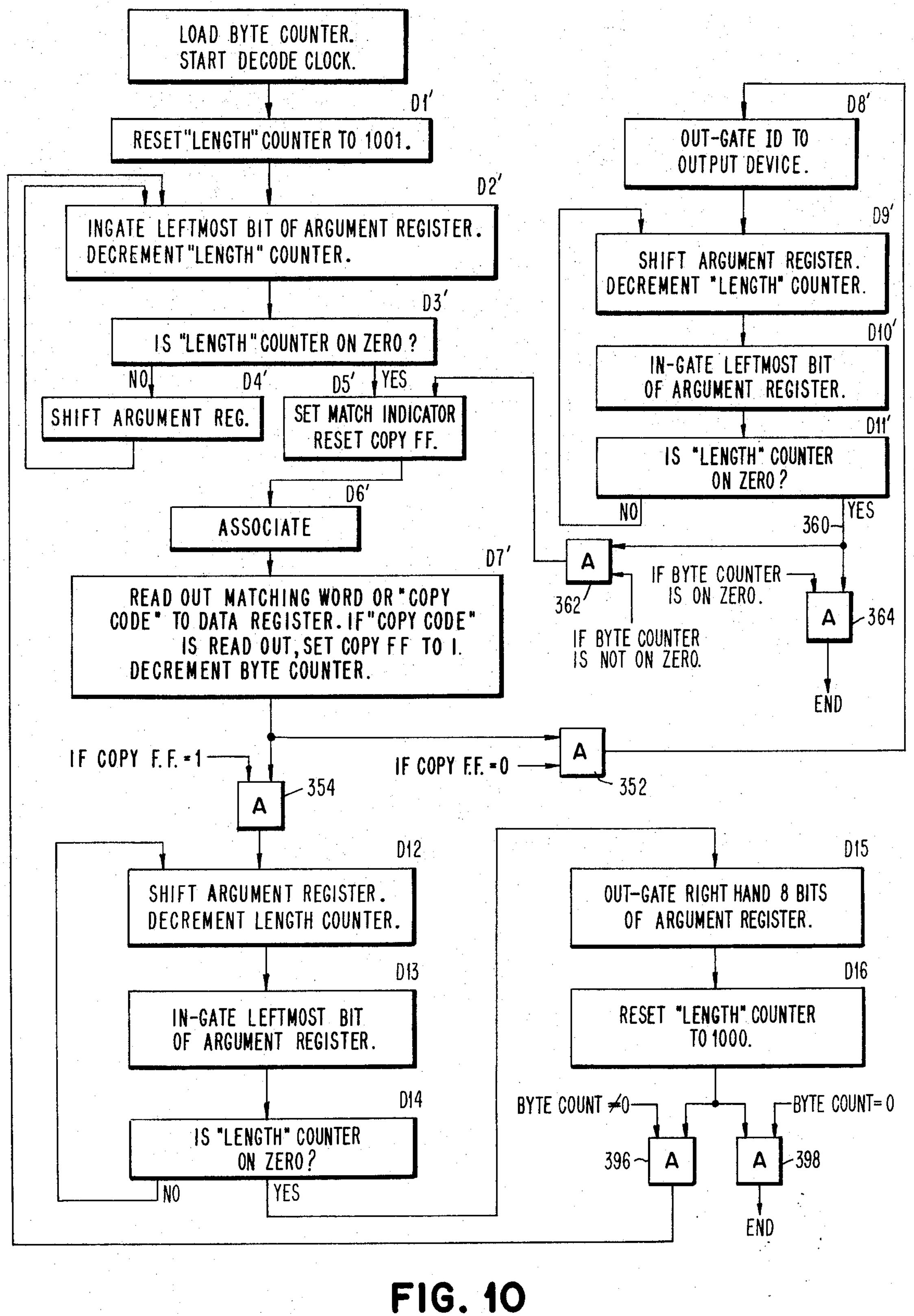
FIG. 10 is a flowchart depicting the operation of the apparatus shown in FIGS. 8A to 8C while it is in its decoding mode.

The circuit diagram in FIGS. 8A–8C and the flowcharts in FIGS. 9 and 10 illustrate in greater detail the construction and operation of the modified system embodying the COPY feature. In these figures, the circuit elements which perform functions similar to those of the elements shown in the first system (FIGS. 1–5) are identified by similar reference characters, with a prime (') being added to each such reference character in the present system. To correlate the flowcharts in FIGS. 9 and 10 with the structure shown in 8A–8C, the steps of these flowcharts are respectively designated by the reference characters applied to the lines carrying the clock pulses which initiate these steps. For example, step E1' in FIG. 9 is initiated by a clock pulse applied through the line E1' shown in FIGS. 8C and 8B.

As mentioned previously herein, the associative memory AM', FIG. 8A, has a much smaller capacity than the associative memory AM, FIG. 3A, because in the present embodiment the associative memory is not required to perform a code converting function for every possible code bit combination that may be presented to it. The more frequently occurring codes (which in the present example are assumed to be those codes whose lengths do not exceed 9 bits in their encoded variable-length form) are handled in essentially the same fashion as described hereinabove with reference to FIGS. 1–5. Hence, the encoding and decoding operations involving such codes will not be explained in detail at this point in the description. Attention will be given more particularly herein to those operations which involve the less frequently occurring ID codes which, if encoded in the normal manner, would produce variable-length codes exceeding 9 bits in length. For such codes, a special COPY coding procedure is followed, as will be explained presently.

In the present case, it is assumed that the majority of the possible byte configurations which constitute the ID codes will fall into the category of less frequently occurring codes for which the COPY procedure is followed. All codes in this group are assigned the same probability rank and they are represented collectively by a common COPY code which, in the encoded format, will precede the ID code and identify it as one which has been "copied" without the normal encoding. Furthermore, each code in this group is assigned the same length count, corresponding to the number of significant bits in the COPY code. The length and form of the COPY code will depend upon the probability rank of the group of codes which it represents (when considered as a single entity) with respect to the other available codes.

An encoding operation now will be described with reference to FIG. 9 in conjunction with FIGS. 8A–8C. The byte counter 80', FIG. 8B is set to the number of ID code bytes which are to be encoded. A start pulse is applied to the line 90', FIG. 8C, for initiating the operation of the encode clock. At step E1', FIG. 9, the ID code which is to be encoded is entered into the argument register 100', FIG. 8A. The match indicators 50', FIG. 7, in the associative memory controls are reset to 1. In the present embodiment, an additional function is performed by the E1' clock pulse. Referring to FIG. 8B, the E1' pulse is applied through an OR circuit 300 to the COPY flip-flop 296 resetting it to its 0 state.

At steps E2' and E3', FIG. 9, an association is performed with the ID code in the argument register to find a matching word. If a matching word is found in the memory AM', the variable-length code contained therein is read out and entered into the data register 120', FIG. 8A. If no matching word is found, then the associative memory controls 56', FIG. 7, will activate the read-select line of the COPY code for causing this COPY code to be read out and entered into the variable-length code field of the data register 120'. At the same time, the associative memory controls will extend energization through wire 294 to the COPY flip-flop 296, FIG. 8B for setting this flip-flop in its 1 state. The byte counter 80' then is decremented by 1.

The cycle of steps E4', E5' and E6', FIG. 9, is performed as many times as needed to effect a serial readout of the significant code bits stored in the 9-bit field of the data register 120', FIG. 8A. This applies whether the code stored in the 9-bit field is a variable-length code or a COPY code. When the last significant bit is read out, the setting of the length counter (righthand four positions of data register 120') is reduced to 0. At this time, the gate 138', FIG. 8B, to which the clock pulse E6' is applied, is conditioned to extend energization from the 0 output line 146' of the length counter through a wire 302 to three AND circuits 304, 305 and 306.

If the COPY flip-flop 296 is set to 1, indicating that a COPY code has been read out, a special sequence of steps must be initiated for causing the bits of the ID code stored in the argument register to be serially transmitted immediately following the last bit of the COPY code. This special sequence of steps is designated E7–E10 in FIG. 9, and it is initiated when coincident excitations are applied to the AND circuit 304, that is to say, at the time when the length count is reduced to 0 (step E6') while the COPY flip-flop is in its 1 state. A signal thereupon is passed by the AND circuit 304 through a wire 310 which, as shown in FIGS. 8B and 8C, extends through cable 150' to a single-shot 312, thereby turning this single-shot on for generating a clock pulse on line E7. This E7 clock pulse is effective to reset the length counter to 1000 (i.e., decimal 8). This prepares the length counter to control the readout of the 8 bits of the ID code stored in the argument register 100', FIG. 8A.

When single-shot 312 turns off, it applies a pulse through an OR circuit 314, FIG. 8C to a single-shot 316, which turns on to generate a clock pulse on the line E8, FIGS. 8C, 8B and 8A. This extends energization to a gate 320, FIG. 8A thereby outgating the rightmost bit from argument register 100' to the output device.

Following this action, a single-shot 322, FIG. 8C, is turned on for generating a clock pulse on the E9 wire. This has two effects, namely, energizing the shift line for the argument register 100', FIG. 8A, and decrementing the length counter by 1. Following this, the single shot 324, FIG. 8C, is turned on for generating a clock pulse on line E10, which conditions a gate 326, FIG. 8B, for testing the condition of the length counter.

If the length counter is not on 0 (meaning that there are additional code bits to be read out of the ID argument register) energization is extended from the not-zero output line 144' of the length counter through the gate 326 to a wire 330 and thence through the OR circuit 314, FIG. 8C, to single shot 316. This action re-initiates the sequence of steps E8, E9 and E10, FIG. 9, for shifting the next code bit out of the ID argument register. This cycle is repeated as many times as needed to shift all of the ID code bits out of the argument register.

Since there are 8 ID code bits to be read out of the argument register, and the length counter was set initially the same value, (step E7), the reading out of the final ID code bit reduces the length counter setting to 0. Hence, the test at step E10 now causes the gate 326, FIG. 8B, to pass energization from the 0 length count line 146' to a wire 332 leading to AND circuits 334 and 335. Assuming that the byte counter setting is not 0 at this time, the AND circuit 334 is active, causing energization to be applied through wire 336, FIGS. 8B and 8C and OR circuit 92' to single-shot 94', thereby initiating a new encoding sequence starting with step E1', FIG. 9. By the time this occurs, the 8 bits of the ID code will have been read out of the argument register 100', FIG. 8A, following the train of COPY code bits that previously were read out of the 9-bit field of the data register 120'. Thus, a composite COPY-ID code bit string has been generated.

The above described sequence of steps E1'–E6' is now repeated. If the next succeeding ID code stored in the argument register 100' is not one of the codes falling into the special COPY category, the copy flip-flop 296, FIG. 8B, will retain its initial 0 setting. Under these conditions, if the byte counter setting has not yet been reduced to 0, the AND circuit 334, FIGS. 8B and 9, passes a signal for re-initiating step E1' as soon as the last significant bit has been read from the variable-length code field of the data register. The actions which take place when the COPY flip-flop is maintained in its 0 setting are normal encoding or decoding operations as described hereinabove with respect to the first embodiment (FIGS. 1–5).

When the byte counter setting is reduced to 0, and the COPY flip-flop setting also is 0 at this time, AND circuit 335 becomes active to generate an END pulse when the last code bit has been read from the data register. However, if the copy flip-flop setting is 1 at this time, this indicates that only the COPY code bits have been read out, and it is necessary now to read out the ID code bits which are to follow the COPY code. In this instance, the AND circuit 304, FIGS. 8B and 9 becomes effective to initiate the branch operation represented by steps E7–E10 wherein the ID code bits are read out. When the last ID code bit has been read out, if the byte counter setting then is 0, the AND circuit 335 becomes operative to generate an END pulse for terminating the operation.

The decoding operation of the modified system will be described with reference to FIG. 10 in conjunction with FIGS. 8A–8C. It will be recalled that when an incoming code bit string consists of a COPY code followed by an ID code (FIG. 6), the COPY code must be disregarded by the system, and the succeeding 8 bits of the ID code then are read out directly as the decoded output, bypassing the normal decoding procedure. For all other received bit strings, normal decoding occurs as described hereinabove with reference to the embodiment illustrated in FIGS. 1–5.

Referring again to FIG. 8C, the decoding operation is initiated by the application of a start pulse on wire 180', which turns on the single-shot 182'. The byte counter 80', has been loaded with the number of variable-length codes which are to be decoded into ID code bytes. As single-shot 182' goes on, a clock pulse is applied through wire D1' to a means indicated in FIG. 8A for resetting the length counter to 1001 (decimal 9). At this stage of the operation, it is necessary to fill the 9-bit argument register 178' with successive bits of the first variable-length code and any succeeding codes, up to the first 9 bits. The process of filling the argument register 178' is carried out in the sequence of steps D2', D3' and D4', FIG. 9, which will be repeated until the length counter has been decremented to 0000 at step D3'. The gate 202', FIG. 8B, then passes a signal from the 0 output line 146' of the length counter to wire 220' and OR circuit 222' for turning on the single-shot 224; which generates a clock pulse for line D5'.

The D5' clock pulse resets to 1 the match indicators 50' of the associative memory controls 56'. It also passes through OR circuit 300, FIG. 8B, to reset the COPY flip-flop 296 to 0. Single-shot 226' then goes on to generate the D6' clock pulse, which causes the contents of argument register 178' to be associated with the contents of the 9-bit variable-length code field of the associative memory AM'. If a matching word is found, it is read out to the data register 120' (step D7', FIG. 10), and the COPY flip-flop 296 remains at its 0 setting. If no matching word is found, then the wire 294, FIGS. 8A and 8B, leading from the memory controls 56' is energized to set the COPY flip-flop into its 1 state, indicating that the rightmost code stored in argument register 178' is a COPY code. The D7' clock pulse also is effective to decrement the byte counter 80'.

As single-shot 232' (which generated the D7' clock pulse) goes off, it generates a pulse on wire 350, FIGS. 8C and 8B, which leads to the inputs of AND circuits 352 and 354. If the COPY flip-flop 296 is on 0 (meaning that no COPY code is involved), circuit is extended from wire 350 through AND gate 352 and wire 356, FIGS. 8B and 8C, to single-shot 236', which goes on to generate a clock pulse for line D8'. The normal decoding sequence comprising steps D8' through D11', FIG. 10, then is performed, causing the bits of the retrieved ID code stored in the 8-bit ID field of the data register 120' to be read out in parallel to the output device. The bits stored in the argument register 178' are progressively shifted in the descending-order direction until the length counter setting is reduced to 0 (D9' through D11').

As the length counter setting goes to 0, circuit is extended from wire 146' through the gate 248', FIG. 8B to a wire 360 leading to AND circuits 362 and 364. If the byte counter setting has not yet been reduced to 0, circuit continues through AND gate 362, wire 366 and OR circuit 222', FIG. 8C, to single-shot 224' for initiating a new sequence of steps D5'–D7, FIG. 10. If the byte counter setting were 0, however, the AND circuit 364, FIG. 8B would be activated to generate an END pulse. Matching and readout operations are performed as above described until the COPY code is encountered in the argument register 178'. After the COPY code has been stored in the data register 120', (step D7', FIG. 10), the COPY flip-flop 296, FIG. 8B will be in its 1 state. Under these conditions, when the single-shot 232', FIG. 8C, turns off to generate a pulse on the wire 350, the AND circuit 354, FIG. 8B, is effective to pass this pulse from wire 350 to a wire 370, FIGS. 8B and 8C, and thence through an OR circuit 372 to a single-shot 374. As the single-shot 374 turns on, it generates a clock pulse on wire D12, thereby initiating a special sequence of steps D12–D16, FIG. 10, for decoding the combination of a copy code followed by an ID code which has been received. Briefly, this special decoding operation involves shifting the copy code out of the argument register 178' and then reading the 8 following code bits from this register, the latter constituting the ID code which is to be retrieved.

To consider this special decoding operation in detail, the D12 clock pulse is applied through the OR circuit 210' to the shift line 212' for the argument register 178'. This causes the argument register 178' to shift its contents by one bit position to the right. At the same time, the D12 clock pulse also is applied through the OR circuit 132', FIG. 8B to the wire 134' which, when pulsed, causes the length counter, FIG. 8A, to be decremented by 1.

When single-shot 374, FIG 8C, turns off, it turns on the single-shot 376 for generating a clock pulse on the line D13. This D13 pulse then passes through the OR circuit 192', FIG. 8B, to the wire 194' for activating the "in" gate 196', FIG. 8A. This feeds a bit from the input device into the leftmost position of the argument register 178' to replace the bit which was shifted out of this register.

When the single-shot 376 goes off, it turns on single-shot 378 for generating a clock pulse on the line D14 which leads to a gate 380, FIG. 8B. If the length counter is not on 0 at this time, the circuit is extended from the not-zero wire 144', FIG. 8B through the gate 380, wire 382 and OR circuit 372, FIG. 8C to the single-shot 374, which turns on to re-initiate the sequence of steps D12 through D14, FIG. 10.

It will be recalled that when the COPY code was first encountered during the "associate" operation (step D6'), the word containing the COPY code was read out and stored in the data register 120'. This caused the length indicator associated with the COPY code to be stored in the length counter section of the data register. Therefore, the sequence of steps D12–D14, FIG. 10 must be repeated as many times as indicated by this length counter setting in order to move all of the COPY code bits out of the argument register 178'. When the length counter setting reaches 0 to indicate that the last COPY code bit has been shifted out of the argument register, the bits now occupying the rightmost 8 positions of the argument register 178' will be the 8 bits of the ID code that immediately followed the COPY code. These are the 8 bits which must be retrieved.

When the test performed by the D14 clock pulse finds the length counter at a 0 setting, circuit is extended from the 0 length count line 146', FIG. 8B through gate 380 and wire 386, FIGS. 8B and 8C, to the single-shot 390, which turns on to generate the D15 clock pulse. This D15 clock pulse is applied to a gate 392, FIG. 8A, for reading out the 8 bits stored in the rightmost 8 positions of the argument register 178', which are read out in parallel to the output device. When the single-shot 390 goes off, FIG. 8C, it turns on the single-shot 393, which generates a D16 clock pulse that passes through the OR circuit 311, FIG. 8B, to the wire 313, FIG. 8A, for resetting the length counter to 1000. The single-shot 393, when it goes off, applies a pulse on the wire 394 leading to AND circuits 396 and 398, FIG. 8B. If the byte count at this time has not yet been reduced to 0, this pulse passes through the AND circuit 396, wire 400 and OR circuit 186', FIG. 8C to the single-shot 190' for re-initiating step D2' of the decode operation, FIG. 10. Steps D2', D3' and D4' then are repeated enough times to reduce the length counter setting from 1000 to 0000, thereby removing the eight bits of the ID code from the argument register 178' and shifting the contents of this register eight positions to the right for bringing the next suceeding code into registry.

If the byte count is at 0 when single-shot 393, FIG. 8C, goes off, the pulse on wire 394 then passes through gate 398, FIG. 8B to generate an END signal for terminating the decoding operation.

While the invention has been particularly shown and described with reference to a preferred embodiment thereof, it will be understood by those skilled in the art that changes in form and details may be made therein without departing from the spirit and scope of the invention.

What is claimed is:

1. In a code conversion process that utilizes a computer having a memory for encoding a succession of fixed-length input codes into an output bit stream composed of variable-length codes which represent the more frequently occurring input codes and fixed-length codes which are respectively identical with the less frequently occurring input codes, the steps of:

a. storing in a first portion of said memory representations of the frequently occurring variable-length codes which may be included in said bit stream;
b. storing in a second portion of said memory representations of the fixed-length codes which respectively correspond to said variable-length codes;
c. comparing each successive one of said input codes with the fixed-length codes stored in said second memory portion; and
d. executing one of the following actions in accordance with the result of each such comparison:
   d1. if an input code matches any of the fixed-length codes stored in said second memory portion, then causing the bits of the corresponding variable-length code stored in said first memory portion to be serially read out as elements of said output bit stream; or
   d2. if the input code does not match any of the fixed-length codes stored in said second memory portion, then serially reading out the bits of such input code as elements of said output bit stream.

2. In a code conversion process that utilizes a computer having a memory for generating fixed-length output codes in response to an input bit stream containing frequently occurring prefix-free variable-length codes mingled with infrequently occurring fixed-length codes, the steps of:

a. storing in a first portion of said memory representations of the frequently occurring variable-length codes which may be included in said bit stream;
b. storing in a second portion of said memory representations of the fixed-length codes which respectively correspond to said variable-length codes;
c. comparing the bits of an input code with the variable-length codes stored in said first memory portion; and
d. executing one of the following actions in accordance with the result of such comparison:
   d1. if said input code matches any of the variable-length codes stored in said first memory portion, then causing the corresponding fixed-length code in said second memory portion to be read therefrom as the output code; or
   d2. if said input code does not match any of the variable-length codes stored in said first memory portion, then causing the bits of said input code to be read out as elements of the output code.

3. In a code conversion process that utilizes a computer having a memory and a shift register for encoding a succession of fixed length input codes into an output bit stream composed partly of variable-length codes representing at least some of the more frequently occurring input codes and also including fixed-length codes identical with at least some of the less frequently occurring input codes, each of the fixed-length output codes being preceded in said bit stream by a special code, the steps of:

a. storing in a first portion of said memory representations of the frequently occurring variable-length codes which may be included in said bit stream;
b. storing in a second portion of said memory representations of the fixed-length codes which respectively correspond to said variable-length codes;
c. storing in a third portion of said memory length indicators which respectively represent the numbers of bits contained in the variable-length codes that are stored in said first memory portion;
d. storing in a fourth portion of said memory a representation of said special code;
e. comparing each successive one of said input codes with the fixed-length codes stored in said second memory portion; and
f. executing one of the following actions in accordance with the result of each such comparison:
   f1. if an input code matches any of the fixed-length codes stored in said second memory portion, then causing the corresponding variable-length code in said first memory portion to be entered into said register, and shifting the contents of said register through the number of bit storing positions represented by the corresponding length indicator stored in said third memory portion for reading out therefrom the bits of the variable-length code that have been entered into said register as elements of said output bit stream; or f2. if the input code does not match any of the fixed-length codes stored in said second memory portion, then serially reading out the bits of the special code stored in said fourth memory portion followed by the bits of said input code as elements of said output bit stream.

4. In a code conversion process that utilizes a computer having a memory and a shift register for generating fixed-length output codes in response to an input bit stream containing frequently occurring prefix-free variable-length codes mingled with infrequently occurring fixed-length codes, each of the fixed-length input codes being preceded in said bit stream by a special code of predetermined length, the steps of:

a. storing in a first portion of said memory representations of the frequently occurring variable-length codes which may be included in said bit stream;

b. storing in a second portion of said memory representations of the fixed-length codes which respectively correspond to said variable-length codes;

c. storing in a third portion of said memory length indicators which respectively represent the numbers of bits contained in the variable-length codes that are stored in said first memory portion;

d. storing in a fourth portion of said memory a length indicator representing the number of bits in said special code;

e. storing in successive orders of said shift register the bits of any selected one of the codes in said bit stream followed by any succeeding bits which may be in said stream, up to the capacity of said register, placing the lowest-order bit of said one code initially in the lowest-order bit storing position of said register;

f. comparing the code bits stored in said shift register with the variable-length codes stored in said first memory portion; and g. executing one of the following actions in accordance with the result of such comparison:

g1. if said one code matches any of the variable-length codes stored in said first memory portion, then causing the corresponding fixed-length code in said second memory portion to be read therefrom as the output code, and shifting the contents of said register through the number of bit storing positions represented by the corresponding length indicator stored in said third memory portion; or g2. if said one code does not match any of the variable-length codes stored in said first memory portion, then shifting the contents of said register through the number of bit storing positions represented by the special code length indicator stored in said fourth memory portion, reading from the resultant setting of said register those bits which occupy positions corresponding to the various orders of a fixed-length code as elements of the output code, and shifting the contents of said register by a like number of bit positions.

5. A code conversion process utilizing a computer having a memory for encoding a succession of fixed-length input codes into output codes which have variable lengths for the more frequently occurring input codes and fixed lengths for the less frequently occurring input codes, said process comprising the following steps:

a. storing representations of said variable-length codes at locations in said memory which may be accessed respectively by the more frequently occurring input codes;

b. storing at another location, which may be accessed by any of the less frequently occurring input codes, a common code which collectively identifies all of such input codes;

c. accessing the respective storage location which is designated by each of the successive input codes; and d. performing one of the following steps according to the particular storage location which is being accessed in each instance:

d1. if the accessed location is one at which a variable-length code is stored, then generating an output code that is identical with said variable-length code; or 2. if the accessed location is the one where said common code is stored, then performing a special encoding operation to generate an output code which consists of said common code combined with the respective input code.

6. A code conversion process utilizing a computer having a memory for decoding a succession of input codes into fixed-length output codes, where the more frequently occurring input codes are variable-length codes and the less frequently occurring input codes are combination codes each including a common code associated with an individual fixed-length code, said process comprising the following steps:

a. storing in said memory, at locations therein which may be accessed respectively by said variable-length codes, representations of fixed-length codes respectively corresponding to said variable-length codes;

b. storing at another location, which may be accessed by said common code, control information indicative of a special decoding operation;

c. accessing the respective storage location which is designated by each of the successive input codes; and d. performing one of the following steps according to the particular storage location which is being accessed in each instance:

d1. if the accessed location is one which is designated by a variable-length code, then generating an output code that is identical with the fixed-length code stored at such location; or d2. if the accessed location is the one designated by said common code, then performing a special decoding operation to generate an output code which is identical with the fixed-length code included within the respective input code.

7. An associative memory apparatus for use as an encoder-decoder to effect conversions between frequently occurring fixed-length codes and corresponding variable-length prefix-free codes without effecting such conversions of the less frequently occurring fixed-length codes, said apparatus comprising:

a. rows of memory cells for storing a plurality of words, each word containing a respective one of the frequently occurring variable-length codes, a corresponding one of the frequently occurring fixed-length codes, and a length indicator which denotes the number of significant bits in the corresponding variable-length code, the cells for storing the variable-length codes being three-state cells arranged in a code field which contains a uniform number of cells for each row, each three-state cell being capable of assuming a significant binary 1 or 0 state or a "don't care" state wherein the bit which it stores is not significant;

b. argument storing means having a portion effective when said apparatus is functioning as a decoder to store strings of bits contained in a series of input codes which may include both variable-length and fixed-length codes, and having a portion effective when said apparatus is functioning as an encoder to store the bits of a fixed-length code which is to be encoded, the portion of said argument storing means which stores input codes during decoding operations being selectively operable to shift the bits stored therein progressively through successive orders;

c. data storing means having a portion effective when said apparatus is functioning as an encoder to store bits which are read from cells in the memory field storing the variable-length codes and having a portion effective when said apparatus is functioning as a decoder to store bits read from cells in the memory field storing the fixed-length codes, and also having a length counter for storing length indicators read from the related memory cells during both encoding and decoding operations, the portion of said data storing means which stores variable-length output codes during encoding operations being selectively operable to shift the bits stored therein progressively through successive orders;

d. encoding control means including the following devices:

d1. a supervisory device responsive to the presence or absence of a match between the fixed-length code in said argument storing means and any of the fixed-length codes corresponding to variable-length codes stored in said memory cells to signal either a normal or a special encoding operation in accordance therewith;

d2. normal encoding control devices which are effective whenever said supervisory device signals a normal encoding operation for causing code bits to be read from the matching row of said variable-length code storing field into said data storing means and for thereafter causing such bits to be shifted out of said data storing means in accordance with the length indicator stored in said length counter; and d3. special encoding control devices effective whenever said supervisory device signals a special encoding operation for causing a special code to be entered into said data storing means and for thereafter causing an output code to be read in part from the encoding portion of said data storing means and in part from the encoding portion of said argument storing means, thereby producing a composite output code consisting of the input fixed-length code preceded by said special code; and e. decoding control means including the following devices:

e1. a supervisory device responsive to the presence or absence of a match between the contents of said argument storing means and any of the variable-length code words stored in said memory cells to signal either a normal or a special decoding operation in accordance therewith;

e2. normal decoding control devices which are effective whenever said supervisory device signals a normal decoding operation for causing a fixed-length code to be read from said data storing means and concurrently causing a new variable-length code to be shifted into said argument storing means in accordance with the length indicator stored in said length counter; and e3. special decoding control devices which are effective whenever said supervisory device signals a special decoding operation for causing the special code portion of the composite input code to be shifted out of said argument storing means and for thereafter causing the succeeding fixed-length code portion of said composite code to be read from said argument storing means as the output code.

8. An associative memory apparatus for use as an encoder to effect conversions between frequently occurring fixed-length codes and corresponding variable-length prefix-free codes without effecting such conversions of the less frequently occurring fixed-length codes, aid apparatus comprising:

a. rows of memory cells for storing a plurality of words, each word containing a respective one of the frequently occurring variable-length codes, a corresponding one of the frequently occurring fixed-length codes, and a length indicator which denotes the number of significant bits in the corresponding variable-length code, the cells for storing the variable-length codes being three-state cells arranged in a code field which contains a uniform number of cells for each row, each three-state cell being capable of assuming a significant binary 1 or 0 state or a "don't care" state wherein the bit which it stores is not significant;

b. an argument register for storing the bits of a fixed-length code which is to be encoded;

c. a data register for storing bits which are read from cells in the memory field storing the variable-length codes and including a length counter for storing length indicators read from the related memory cells during encoding operations, said data register being selectively operable to shift the variable-length code bits stored therein progressively through successive orders; and d. encoding control means including the following devices:

d1. a supervisory device responsive to the presence or absence of a match between the fixed-length code in said argument register and any of the fixed-length codes corresponding to variable-length codes stored in said memory cells to signal either a normal or a special encoding operation in accordance therewith;

d2. normal encoding control devices which are effective whenever said supervisory device signals a normal encoding operation for causing code bits to be read from the matching row of said variable-length code storing field into said data register and for thereafter causing such bits shifted out of said data register in accordance with the length indicator stored in said length counter; and d3. special encoding control devices effective whenever said supervisory device signals a special encoding operation for causing a special code to be entered into said data register and for thereafter causing an output code to be read in part from the encoding portion of said data register and in part from the encoding portion of said argument storing means, thereby producing a composite output code consisting of the input fixed-length code preceded by said special code.

9. An associative memory apparatus for use in decoding an input bit stream which contains frequently occurring variable-length prefix-free codes and infrequently occurring composite codes each consisting of a fixed-length code preceded by a special code of predetermined length, said apparatus comprising:

a. rows of memory cells for storing a plurality of words, each word containing a respective one of the frequently occurring variable-length codes together with a corresponding one of the fixed-length codes and a length indicator which denotes the number of significant bits in the corresponding variable-length code, the cells for storing the variable-length codes being three-state cells arranged in a code field which contains a uniform number of cells for each row, each three-state cell being capable of assuming a significant binary 1 or 0 state or a "don't care" state wherein the bit which it stores is not significant;

b. an argument register for storing the bits of said input bit stream, said argument register being selectively operable to shift the bits stored therein progressively through successive orders;

c. a data register for storing bits read from cells in the memory field storing the fixed-length codes, and including a length counter for storing length indicators read from the related memory cells; and d. decoding control means including the following devices:

d1. a supervisory device responsive to the presence or absence of a match between the contents of said argument storing means and any of the variable-length code words stored in said memory cells to signal either a normal or a special decoding operation in accordance therewith;

d2. normal decoding control devices which are effective whenever said supervisory device signals a normal decoding operation for causing a fixed-length code to be read from said data register and concurrently causing a new variable-length code to be shifted into said argument register in accordance with the length indicator stored in said length counter; and d3. special decoding control devices which are effective whenever said supervisory device signals a special decoding operation for causing the special code portion of the composite input code to be shifted out of said argument register and for thereafter causing the succeeding fixed-length code portion of said composite code to be read from said argument register as the output code.

* * * * *